US011665655B2

(12) United States Patent
Ryu et al.

(10) Patent No.: US 11,665,655 B2
(45) Date of Patent: May 30, 2023

(54) SIDELINK SYNCHRONIZATION SIGNAL FOR CONNECTED USER EQUIPMENT

(71) Applicant: QUALCOMM Incorporated, San Diego, CA (US)

(72) Inventors: Jung Ho Ryu, Fort Lee, NJ (US); Junyi Li, Franklin Park, NJ (US); Sony Akkarakaran, Poway, CA (US); Tao Luo, San Diego, CA (US); Tianyang Bai, Somerville, NJ (US); Kiran Venugopal, Raritan, NJ (US); Ling Ding, Chester, NJ (US); Qian Zhang, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 17/203,105

(22) Filed: Mar. 16, 2021

(65) Prior Publication Data

US 2021/0321343 A1 Oct. 14, 2021

Related U.S. Application Data

(60) Provisional application No. 63/008,579, filed on Apr. 10, 2020.

(51) Int. Cl.
*H04W 56/00* (2009.01)
*H04L 5/00* (2006.01)

(52) U.S. Cl.
CPC ......... *H04W 56/001* (2013.01); *H04L 5/0048* (2013.01)

(58) Field of Classification Search
CPC ..... H04W 8/00; H04W 56/00; H04W 56/001; H04W 72/10; H04W 72/0406; H04W 72/0046
See application file for complete search history.

(56) References Cited

U.S. PATENT DOCUMENTS

2019/0097751 A1\* 3/2019 Li ..................... H04W 56/00
2019/0245599 A1\* 8/2019 Ohara ................ H04B 7/0626
(Continued)

FOREIGN PATENT DOCUMENTS

WO WO-2019160973 A1 8/2019

OTHER PUBLICATIONS

Huawei, et al., "Beamforming for V2X Sidelink for FR1 and FR2", 3GPP Draft, 3GPP TSG RAN WG1 Ad-Hoc Meeting 1901, R1-1900862, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 20, 2019 (Jan. 20, 2019), XP051593708, 5 pages, Retrieved from the Internet: URL: http://www.3gpp.org/ftp/Meetings%5F3GPP%5FSYNC/RAN1/Docs/R1%2D1900862%2Ezip, [retrieved on Jan. 20, 2019], Section 2.3, The Whole Document, p. 1-p. 2.

(Continued)

*Primary Examiner* — Michael Thier
*Assistant Examiner* — Prince A Mensah
(74) *Attorney, Agent, or Firm* — Holland & Hart LLP

(57) ABSTRACT

Methods, systems, and devices for wireless communications are described. Sidelink UEs may be configured with a synchronization reference signal that may be used by the UEs to synchronize time and frequency resources. A first and second UE may perform a beam sweeping procedure to identify transmit and receive beams to use for communications between the UEs. A synchronization reference signal procedure may be initiated and the first UE may receive a sidelink synchronization reference signal from the second UE using the established receive beam. The UEs may align time and frequency resources for communications between the UEs and the UEs may communicate via the sidelink channel based on the time synchronization, frequency syn- (Continued)

chronization, or both, determined using the sidelink synchronization signal. In some cases, a sidelink UE may receive multiple synchronization reference signals from multiple sidelink UEs simultaneously, where each synchronization reference signal may include a UE identifier.

30 Claims, 12 Drawing Sheets

(56) References Cited

U.S. PATENT DOCUMENTS

| | | | | |
|---|---|---|---|---|
| 2020/0052843 | A1 | 2/2020 | Cheng et al. | |
| 2020/0196255 | A1* | 6/2020 | Cheng | H04W 72/10 |
| 2020/0267671 | A1* | 8/2020 | Chae | H04W 92/18 |
| 2021/0014813 | A1* | 1/2021 | Kim | H04W 8/00 |
| 2021/0235401 | A1* | 7/2021 | Yuan | H04L 5/0048 |
| 2021/0297128 | A1* | 9/2021 | Badic | H04W 72/0406 |
| 2021/0352599 | A1* | 11/2021 | Kusashima | G01S 19/256 |
| 2022/0039076 | A1* | 2/2022 | Choi | H04B 7/0695 |
| 2022/0046639 | A1* | 2/2022 | Dong | H04W 72/0446 |
| 2022/0167180 | A1* | 5/2022 | Choi | H04W 56/001 |

OTHER PUBLICATIONS

International Search Report and Written Opinion—PCT/US2021/022736—ISA/EPO—dated Jun. 29, 2021 (203494WO).

Vivo: "NR Sidelink Synchronization Mechanism", 3GPP Draft, 3GPP TSG RAN WG1 #96, R1-1901684, NR Sidelink Synchronization Mechanism, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019 (Feb. 15, 2019), XP051599380, 11 Pages, Retrieved from the Internet: URL: http://www.3gpp.org/ftp/tsg%5Fran/WG1%5FRL1/TSGR1%5F96/Docs/R1%2D1901684%2Ezip. [retrieved on Feb. 15, 2019] the whole document.

Xiaomi Communications: "On Synchronization for NR V2X", 3GPP Draft, R1-1901018, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 20, 2019 (Jan. 20, 2019), XP051593863, 4 Pages, Retrieved from the Internet: URL: http://www.3gpp.org/ftp/Meetings%5F3GPP%5FSYNC/RAN1/Docs/R1%2D1901018%2Ezip. [retrieved on Jan. 20, 2019] the whole document.

* cited by examiner

▦ PSBCH, 220
▨ S-PSS, 225
▩ S-SSS, 230
☐ Gap, 235

200

SIDELINK SYNCHRONIZATION SIGNAL FOR CONNECTED USER EQUIPMENT

CROSS REFERENCE

The present Application for Patent claims the benefit of U.S. Provisional Patent Application No. 63/008,579 by RYU et al., entitled "SIDELINK SYNCHRONIZATION SIGNAL FOR CONNECTED USER EQUIPMENT," filed Apr. 10, 2020, assigned to the assignee hereof, and expressly incorporated by reference herein.

FIELD OF TECHNOLOGY

The following relates generally to wireless communications and more specifically to sidelink synchronization signals for a connected user equipment (UE).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support the establishment of a sidelink channel for communications between two devices, such as two UEs. The two UEs may perform synchronization procedures to establish transmit and receive beams to be used for communications between the two UEs, and the UEs may synchronize resources.

Conventional synchronization procedures may inefficiently utilize resources and may result in unreliable synchronization.

SUMMARY

The described techniques relate to improved methods, systems, devices, and apparatuses that support sidelink synchronization signals for a connected user equipment (UE). Generally, the described techniques provide for improvements in the synchronization of time and frequency resources for sidelink communications between one or more UEs. In some cases, sidelink UEs may be configured with a synchronization reference signal that may be used by the UEs to synchronize time and frequency resources. As such, a first UE may perform a beam sweep procedure with a second UE to identify a transmit beam, a receive beam, or both, to use for communications over a sidelink channel between the first UE and the second UE. The first UE and second UE may also establish initial time and frequency synchronization via the beam sweep procedure. In some cases, one or more of the UEs may move in relation to another UE or the network environment may change and may initiate a transmitting UE (e.g., the second UE) to transmit a synchronization reference signal to a receiving UE (e.g., the first UE). As such, the first UE may receive, via the sidelink channel, a first sidelink synchronization reference signal from the second UE using the established receive beam.

For example, the first UE may establish a sidelink connection with the second UE using one or more beams identified in the beam sweep procedure. For example, each of the first UE and the second UE may identify a transmission beam, a receive beam, or both. The first UE may transmit the sidelink synchronization reference signal using a transmission beam of the established sidelink connection identified in the beam sweep procedure, and the second UE may receive the sidelink synchronization reference signal using the receive beam of the established connection sidelink identified in the beam sweep procedure. The first UE and the second UE may align time and frequency resources for communications between the first UE and the second UE. The first UE and the second UE may communicate a first transmission via the sidelink channel based on the time synchronization, frequency synchronization, or both, determined using the first sidelink synchronization reference signal. In some cases, a sidelink UE may receive multiple synchronization reference signals from multiple sidelink UEs simultaneously, where each synchronization reference signal may include UE identifier information to differentiate the reference signals.

A method for wireless communications by a first UE is described. The method may include performing a beam sweep procedure with a second UE to identify a receive beam to use for communication with the second UE over a sidelink channel, receiving, via the sidelink channel, a first sidelink synchronization reference signal from the second UE using the receive beam identified in the beam sweep procedure, and communicating a first transmission via the sidelink channel based on time synchronization, frequency synchronization, or both, determined using the first sidelink synchronization reference signal.

An apparatus for wireless communications by a first UE is described. The apparatus may include a processor, memory coupled with the processor, and instructions stored in the memory. The instructions may be executable by the processor to cause the apparatus to perform a beam sweep procedure with a second UE to identify a receive beam to use for communication with the second UE over a sidelink channel, receive, via the sidelink channel, a first sidelink synchronization reference signal from the second UE using the receive beam identified in the beam sweep procedure, and communicate a first transmission via the sidelink channel based on time synchronization, frequency synchronization, or both, determined using the first sidelink synchronization reference signal.

Another apparatus for wireless communications by a first UE is described. The apparatus may include means for performing a beam sweep procedure with a second UE to identify a receive beam to use for communication with the second UE over a sidelink channel, means for receiving, via the sidelink channel, a first sidelink synchronization reference signal from the second UE using the receive beam identified in the beam sweep procedure, and means for communicating a first transmission via the sidelink channel based on time synchronization, frequency synchronization, or both, determined using the first sidelink synchronization reference signal.

A non-transitory computer-readable medium storing code for wireless communications by a first UE is described. The code may include instructions executable by a processor to perform a beam sweep procedure with a second UE to identify a receive beam to use for communication with the second UE over a sidelink channel, receive, via the sidelink channel, a first sidelink synchronization reference signal from the second UE using the receive beam identified in the beam sweep procedure, and communicate a first transmission via the sidelink channel based on time synchronization, frequency synchronization, or both, determined using the first sidelink synchronization reference signal.

Some examples of the method, apparatuses, and non-transitory computer-readable medium described herein may further include operations, features, means, or instructions for receiving control signaling indicating a periodicity of transmission of the first sidelink synchronization reference signal by the second UE, and monitoring the sidelink channel for a transmission of the first sidelink synchronization reference signal using the receive beam based on the periodicity.

Some examples of the method, apparatuses, and non-transitory computer-readable medium described herein may further include operations, features, means, or instructions for receiving control signaling scheduling transmission of the first sidelink synchronization reference signal, where the first sidelink synchronization reference signal may be received in accordance with the control signaling.

Some examples of the method, apparatuses, and non-transitory computer-readable medium described herein may further include operations, features, means, or instructions for transmitting control signaling requesting transmission of the first sidelink synchronization reference signal, where the first sidelink synchronization reference signal may be received in accordance with the control signaling.

In some examples of the method, apparatuses, and non-transitory computer-readable medium described herein, transmitting the control signaling may include operations, features, means, or instructions for transmitting the control signaling based on detected motion of the first UE, the second UE, or both.

Some examples of the method, apparatuses, and non-transitory computer-readable medium described herein may further include operations, features, means, or instructions for receiving control signaling indicating a semi-persistent transmission schedule for transmission of the first sidelink synchronization reference signal by the second UE, and monitoring the sidelink channel for a transmission of the first sidelink synchronization reference signal using the receive beam based on the semi-persistent transmission schedule.

Some examples of the method, apparatuses, and non-transitory computer-readable medium described herein may further include operations, features, means, or instructions for receiving, via the sidelink channel, a second synchronization reference signal from a third UE using the receive beam, and communicating a second transmission via the sidelink channel based on time synchronization, frequency synchronization, or both, determined using the second synchronization reference signal.

In some examples of the method, apparatuses, and non-transitory computer-readable medium described herein, receiving the second synchronization reference signal may include operations, features, means, or instructions for receiving the second synchronization reference signal that indicates an identifier of the third UE that differs from an identifier of the second UE indicated in the first sidelink synchronization reference signal.

In some examples of the method, apparatuses, and non-transitory computer-readable medium described herein, communicating the first transmission via the sidelink channel may include operations, features, means, or instructions for communicating the first transmission via the sidelink channel using a beam having a beam width that may be narrower than the receive beam.

In some examples of the method, apparatuses, and non-transitory computer-readable medium described herein, the first and second sidelink synchronization reference signals may be received concurrently or simultaneously.

Some examples of the method, apparatuses, and non-transitory computer-readable medium described herein may further include operations, features, means, or instructions for receiving a sidelink synchronization signal block (SSB) transmission from the second UE.

In some examples of the method, apparatuses, and non-transitory computer-readable medium described herein, a periodicity of transmission of the first sidelink synchronization reference signal may be shorter than a periodicity of transmission of the sidelink SSB transmission.

A method for wireless communications by a first UE is described. The method may include performing a beam sweep procedure with a second UE to identify a transmission beam to use for communication with the second UE over a sidelink channel, transmitting, via the sidelink channel, a first sidelink synchronization reference signal to the second UE using the transmission beam identified in the beam sweep procedure, and communicating a first transmission via the sidelink channel using the transmission beam based on time synchronization, frequency synchronization, or both, corresponding to the first sidelink synchronization reference signal.

An apparatus for wireless communications by a first UE is described. The apparatus may include a processor, memory coupled with the processor, and instructions stored in the memory. The instructions may be executable by the processor to cause the apparatus to perform a beam sweep procedure with a second UE to identify a transmission beam to use for communication with the second UE over a sidelink channel, transmit, via the sidelink channel, a first sidelink synchronization reference signal to the second UE using the transmission beam identified in the beam sweep procedure, and communicate a first transmission via the sidelink channel using the transmission beam based on time synchronization, frequency synchronization, or both, corresponding to the first sidelink synchronization reference signal.

Another apparatus for wireless communications by a first UE is described. The apparatus may include means for performing a beam sweep procedure with a second UE to identify a transmission beam to use for communication with the second UE over a sidelink channel, means for transmitting, via the sidelink channel, a first sidelink synchronization reference signal to the second UE using the transmission beam identified in the beam sweep procedure, and means for communicating a first transmission via the sidelink channel using the transmission beam based on time synchronization, frequency synchronization, or both, corresponding to the first sidelink synchronization reference signal.

A non-transitory computer-readable medium storing code for wireless communications by a first UE is described. The code may include instructions executable by a processor to perform a beam sweep procedure with a second UE to identify a transmission beam to use for communication with the second UE over a sidelink channel, transmit, via the sidelink channel, a first sidelink synchronization reference signal to the second UE using the transmission beam identified in the beam sweep procedure, and communicate a first transmission via the sidelink channel using the transmission beam based on time synchronization, frequency synchronization, or both, corresponding to the first sidelink synchronization reference signal.

Some examples of the method, apparatuses, and non-transitory computer-readable medium described herein may further include operations, features, means, or instructions for transmitting control signaling indicating a periodicity of transmission of the first sidelink synchronization reference signal, where the first sidelink synchronization reference signal may be transmitted in accordance with the periodicity.

Some examples of the method, apparatuses, and non-transitory computer-readable medium described herein may further include operations, features, means, or instructions for transmitting control signaling scheduling transmission of the first sidelink synchronization reference signal, where the first sidelink synchronization reference signal may be transmitted in accordance with the control signaling.

Some examples of the method, apparatuses, and non-transitory computer-readable medium described herein may further include operations, features, means, or instructions for receiving control signaling requesting transmission of the first sidelink synchronization reference signal, where the first sidelink synchronization reference signal may be transmitted in accordance with the control signaling.

Some examples of the method, apparatuses, and non-transitory computer-readable medium described herein may further include operations, features, means, or instructions for transmitting control signaling indicating a semi-persistent transmission schedule for transmission of the first sidelink synchronization reference signal, where the first sidelink synchronization reference signal may be transmitted in accordance with the control signaling.

In some examples of the method, apparatuses, and non-transitory computer-readable medium described herein, transmitting the first sidelink synchronization reference signal may include operations, features, means, or instructions for transmitting the first sidelink synchronization reference signal that indicates an identifier of the first UE.

Some examples of the method, apparatuses, and non-transitory computer-readable medium described herein may further include operations, features, means, or instructions for transmitting a sidelink SSB transmission.

In some examples of the method, apparatuses, and non-transitory computer-readable medium described herein, a periodicity of transmission of the first sidelink synchronization reference signal may be shorter than a periodicity of transmission of the sidelink SSB transmission.

DETAILED DESCRIPTION

Figure 1:
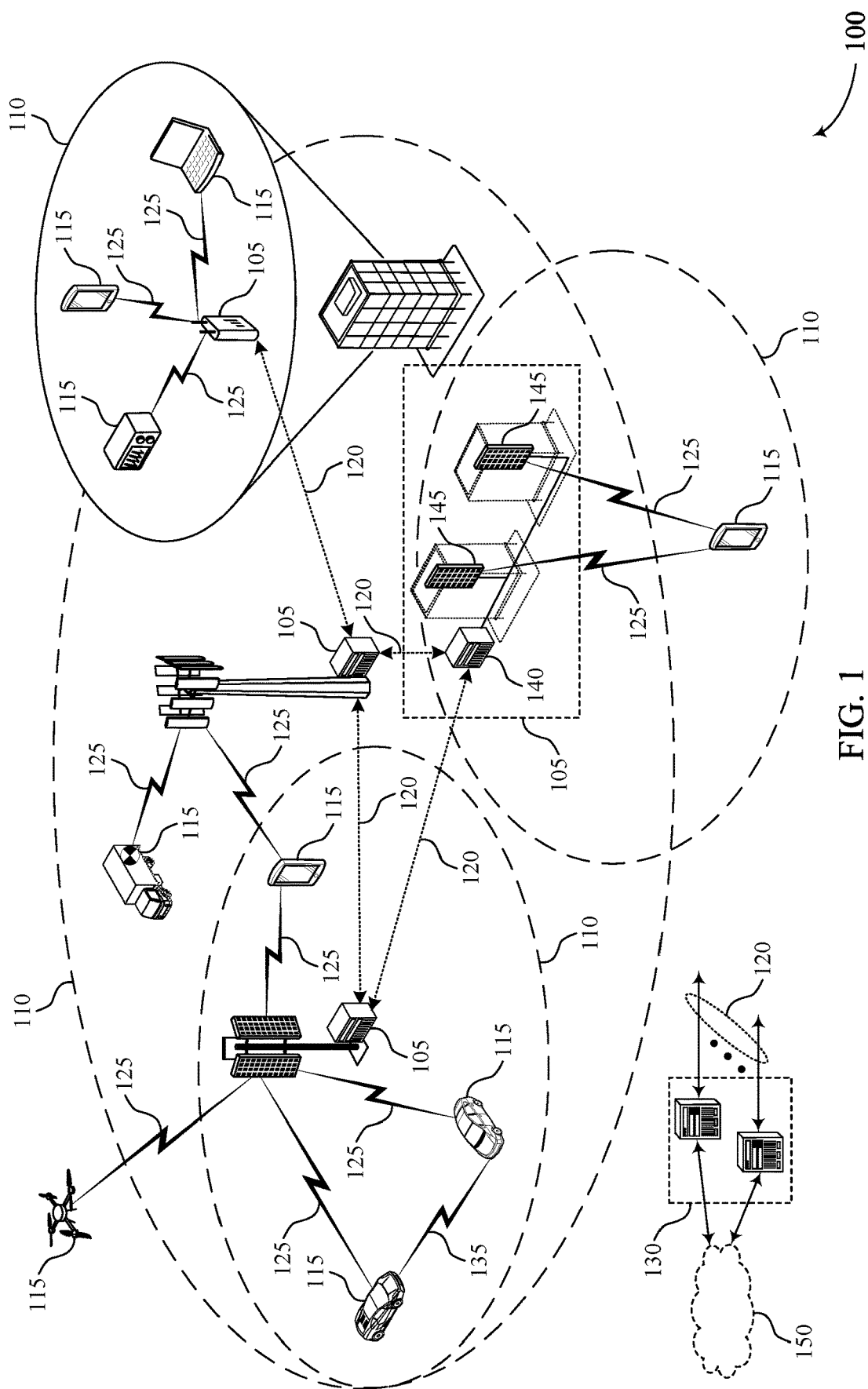
FIGS. 1 through 3 illustrate examples of systems for wireless communications that support sidelink synchronization signals for a connected user equipment (UE) in accordance with aspects of the present disclosure.

A wireless communications system may support both access links and sidelinks for communications between wireless devices. An access link may refer to a communication link between a user equipment (UE) and a base station. For example, an access link may support uplink signaling, downlink signaling, and connection procedures between devices, such as a UE and base station. A sidelink may refer to any communication link between similar wireless devices (e.g., a communication link between UEs, a backhaul communication link between base stations, etc.). It is noted that while various examples provided herein are discussed for UE sidelink devices, such sidelink techniques may be used for any type of wireless devices that use sidelink communications. For example, a sidelink may support device-to-device (D2D) communications, vehicle-to-everything (V2X) or vehicle-to-vehicle (V2V) communications, message relaying, discovery signaling, beacon signaling, or any combination of these or other signals transmitted over-the-air from one wireless device to one or more other wireless devices.

Some wireless communications systems may support establishment of a sidelink channel for communications between two devices, such as two UEs. Prior to communicating over the sidelink channel, the two UEs may perform a synchronization procedure (e.g., a beam sweeping procedure) by using synchronization signal blocks (SSBs) to establish transmit and receive beams to be used for communications between the two UEs. In some cases, the UEs may synchronize time and frequency resources during the synchronization procedure. In some cases, the sidelink UEs may move or the network environment may change such that time and frequency resources may become out-of-sync between the two UEs. To periodically re-synchronize the time and frequency resources, the UEs may again perform a synchronization procedure by beam sweeping using an SSB that involves determining a transmit beam, a receive beam, time resources, and frequency resources between the two UEs. In some cases, performing a beam sweeping procedure to re-synchronize time and frequency resources may inefficiently utilize resources because the transmit and receive beam pairs initially determined by the sidelink UEs may not need to be updated. Further, as the amount of resources may be large to transmit an SSB over multiple beams, the periodicity of the beam sweeping synchronization procedure may be infrequent and may result in unreliable transmissions between the two UEs as the UEs may be operating with outdated time and frequency synchronization.

In some wireless communications systems, sidelink UEs may be configured to transmit sidelink reference signals, such as sidelink synchronization reference signals, to other sidelink UEs over a previously determined beam pair to update time synchronization, frequency synchronization, or both. As such, the sidelink UEs may each transmit an SSB over one or more beams via a beam sweeping procedure to initially establish a transmit and receive beam pair, and time and frequency synchronization (e.g., initial time and frequency synchronization) between the sidelink UEs. Upon initial establishment, the UEs may utilize the synchronization reference signals to update time and frequency resource synchronization over the established beam pair. In some implementations, the synchronization reference signal may be transmitted dynamically, as network conditions change or as one or both the sidelink UEs move in relation to one another, or the synchronization signal may be transmitted periodically, or semi-persistently. In some cases, the synchronization reference signal may be transmitted more frequently compared to the SSB transmitted over multiple beams because the synchronization reference signal may use less resources. In some implementations, a sidelink UE may receive multiple synchronization reference signals from multiple UEs, where each synchronization reference signal includes UE identifier information (e.g., a UE ID) to differentiate the synchronization reference signals. In some implementations, a sidelink UE may transmit one or more synchronization reference signals to one or more other sidelink UEs simultaneously.

Particular aspects of the subject matter described herein may be implemented to realize one or more advantages. The described techniques may support improvements in resource synchronization between sidelink UEs by improving reliability, decreasing signaling overhead, and increasing resource utilization efficiency among other advantages. As such, supported techniques may include improved network operations and, in some examples, may promote network efficiencies, among other benefits.

Aspects of the disclosure are initially described in the context of wireless communications systems. Aspects are then described with respect to a process flow. Aspects of the disclosure are further illustrated by and described with reference to apparatus diagrams, system diagrams, and flowcharts that relate to sidelink synchronization signals for a connected UE.

FIG. 1 illustrates an example of a wireless communications system 100 that supports sidelink synchronization signals for a connected UE in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some wireless communications systems, sidelink UEs 115 may be configured with a synchronization reference signal that may be used by the UEs 115 to synchronize time and frequency resources. As such, a first UE 115 may perform a beam sweep procedure with a second UE 115 to identify a receive beam and a transmit beam to use for communications over a sidelink channel between the first UE 115 and the second UE 115. The first UE 115 and second UE 115 may also establish initial time and frequency synchronization via the beam sweep procedure. In some cases, the UEs 115 may move in relation to one another or the network environment may change which may initiate (e.g., trigger) the transmitting UE 115 (e.g., the second UE 115) to transmit a synchronization reference signal to the receiving UE 115 (e.g., the first UE 115). In some cases, a UE 115 may be configured to transmit a synchronization reference signal periodically and may not need a trigger to transmit said synchronization reference signal. The first UE 115 may receive, via the sidelink channel, a first sidelink synchronization reference signal (e.g., a dynamically triggered synchronization reference signal, a periodically or semi-persistently transmitted synchronization reference signal) from the second UE 115 using the established receive beam. The first UE 115 and the second UE 115 may align time and frequency resources for communications between the first UE 115 and the second UE 115. The first UE 115 and the second UE 115 may communicate a first transmission via the sidelink channel based on the time synchronization, frequency synchronization, or both, determined using the first sidelink synchronization reference signal. In some cases, a sidelink UE 115 may receive multiple synchronization reference signals from multiple sidelink UEs 115 simultaneously, where each synchronization reference signal may include UE identifier information.

Figure 2:
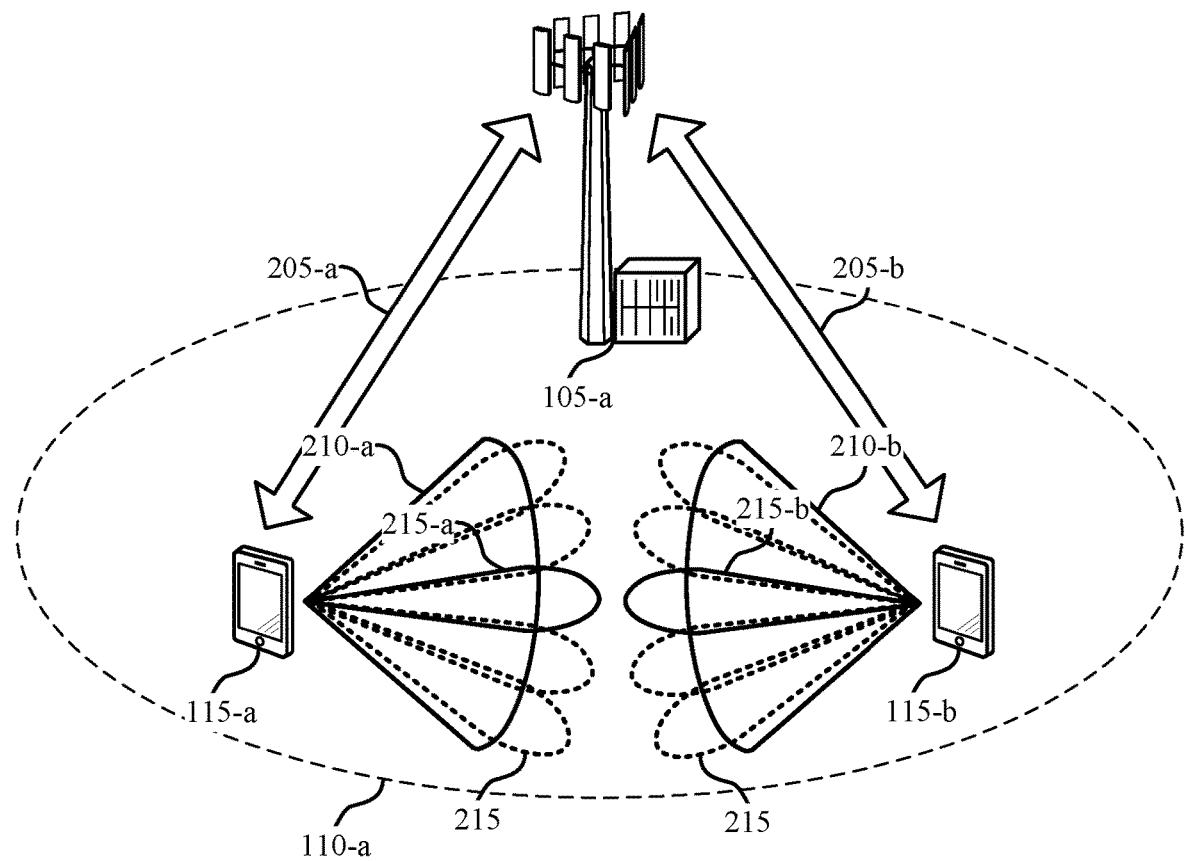
Figure 2:
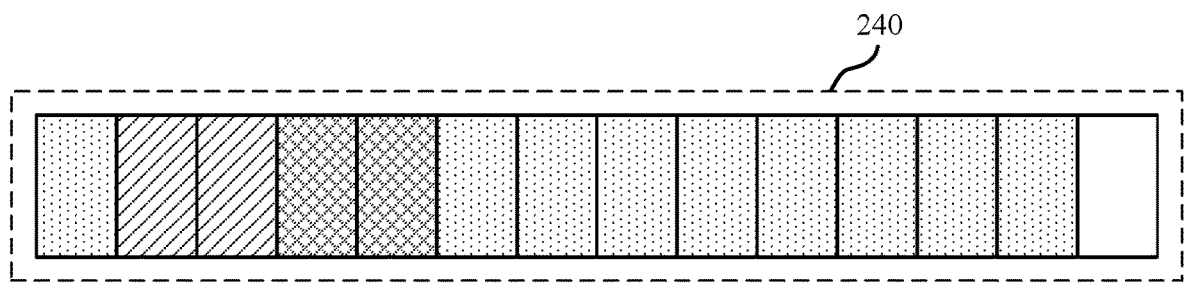

FIG. 2 illustrates an example of a wireless communications system 200 that supports sidelink synchronization signals for a connected UE in accordance with aspects of the present disclosure. The wireless communications system 200 may include base station 105-a and UEs 115-a, and 115-b, which may be examples of a base station 105 and UEs 115 as described with reference to FIG. 1. Base station 105-a may serve a geographic coverage area 110-a. In some cases, base station 105-a may provide a resource pool to UEs 115-a, and 115-b. In some cases, UEs 115-a and 115-b may communicate via a sidelink channel and may perform resource synchronization using synchronization reference signals. Additionally or alternatively, other wireless devices, such as a base station 105, or some combination of UEs 115 and base stations 105 may implement a sidelink resource synchronization procedure.

UE 115-a and UE 115-b may each be connected (e.g., in a connected mode) with base station 105-a and may communicate over communication channel 205-a and communication channel 205-b, respectively. In some cases, base station 105-a may allocate a resource pool, including time resources, frequency resources, or both, to UE 115-a and UE 115-b over communication channels 205-a, and 205-b, respectively. In some cases, the resource pool may be used by the UEs 115 for sidelink communications between UEs 115-a and 115-b. In some cases, base station 105-a may indicate a schedule for sidelink communications between UEs 115-a and 115-a. In some cases, UE 115-a and UE 115-b may autonomously determine sidelink communications.

To establish a sidelink connection between UEs 115-a and 115-b, UEs 115-a and 115-b may perform a beam sweeping procedure to determine a beam pair for communications between the two UEs 115. In some examples, UEs 115-a may engage in a beam sweeping operation to establish an active transmit beam and an active receive beam with UE 115-*b*. The UEs 115 may establish wide transmit and receive beams 210 and narrow transmit and receive beams 215. To establish transmit and receive beams (e.g., wide beams 210, and/or narrow beams 215), a UE 115, such as UE 115-*a*, may broadcast an S-SSB 240 over multiple beams. The S-SSB 240 may include one or more physical sidelink broadcast channels (PSBCHs) 220, one or more sidelink primary synchronization signal (S-PSSs) 225, one or more sidelink secondary synchronization signal (S-SSSs) 230, and one or more gaps 235. The one or more S-PSSs 225, or the one or more S-SSSs 230, or a combination thereof may be used for time tracking, or frequency tracking or a combination thereof. In some cases, the one or more P-SSSs 225, or the one or more S-SSSs 230, or a combination thereof may include an identifier of the UE 115 that is transmitting the S-SSB 240 (e.g., identifier of UE 115-*a*). One or more of the PSBCHs 220 may include information about the system. For example, one or more of the PSBCHs 220 may indicate a frame number of the PSBCH 220, a duplexing configuration (e.g., TDD configuration), a bandwidth configuration (e.g., SL-BWP), a coverage (e.g., in-coverage, out-of-coverage), a synchronization source, etc. In some cases, a PSBCH 220 may include a DMRS that may be used for time tracking, frequency tracking, or both. Another UE 115, such as UE 115-*b*, may receive the S-SSB 240 from UE 115-*a* over one or more beams. UE 115-*b* may use the received S-SSBs 240 to track time, or frequency, or both between UE 115-*a* and UE 115-*b* and to determine transmit and receive beams 215 between the UEs 115.

For example, UE 115-*a* may transmit relatively wide-formed beams (e.g., wide beams 210), that may be transmitted towards different sectors or geographic directions, over a duration of time. In some cases, each wide beam 210 may be associated with an S-SSB 240 in which synchronization signals (e.g., an S-PSS 225 and an S-SSS 230) and PSBCH transmissions 220 may be transmitted in the corresponding beam direction. In some cases, UE 115-*b* may also transmit relatively wide-formed beams (e.g., wide beams 210), over a same or different duration. UE 115-*b* may measure the synchronization signals received over one or more of the wide beams 210 from UE 115-*a* and select a wide beam pair based on the measurements and may indicate the wide beam pair to UE 115-*a*, or base station 105-*a*, or both. In some cases, UE 115-*a* may measure the received synchronization signals received over wide beams 210 from UE 115-*b*, select a wide beam pair based on the measurements, and may indicate the wide beam pair to UE 115-*b*, or base station 105-*a*, or both. In some cases, the wide beam pair may be selected based on measurements performed by UE 115-*a*, or UE 115-*b*, or both. In some implementations, base station 105-*a* may indicate the selected wide beam pair to UEs 115-*a* and 115-*b*. The beam sweeping procedure may result in a beam pair including wide beams 210-*a* and 210-*b*.

In some cases, wide beams 210 may not be narrow enough or have enough beamforming gain to provide for reliable communications between UE 115-*a* and UE 115-*b*. Therefore, it may be beneficial for UE 115-*a* and UE 115-*b* to use beam refinement to generate a narrower beamformed signal that may be used to communicate, which may have a narrower coverage area but higher gain. During beam refinement, one or both of UEs 115-*a* and 115-*b* may sweep narrow-formed beams 215 within the range covered by the selected wide beam 210. For example, UE 115-*a* may beam sweep narrow beams 215 that are within the range of wide beam 210-*a*. UE 115-*b* may beam sweep narrow beams 215 that are within the range of wide beam 210-*b*. As with the wide beam pair selection, one or both of the UEs 115 may receive synchronization signals over one or more of the narrow beams 215, measure the received synchronization signals, and determine a beam pair to use for sidelink communications between UE 115-*a* and UE 115-*b*. For example, UE 115-*a*, UE 115-*b*, or both, or base station 105-*a* may select narrow beams 215-*a* and 215-*b* as the narrow beam pair.

In some cases, the SSB may be used by UEs 115-*a* and 115-*b* to synchronize time and frequency resources for communications between the two UEs 115. For example, UE 115-*a* may transmit a signal to UE 115-*b*. UE 115-*b* may expect to receive the signal at some time (e.g., time zero). However, UEs 115-*a* and 115-*b* are separated in distance which may cause a propagation delay of the signal due to the finite speed of signals. As such, UE 115-*a* may transmit the signal some time prior to the time UE 115-*b* expects the signal. For example, UE 115-*b* may expect to receive the signal at time zero, so UE 115-*a* may transmit the signal some time prior to time zero based on the separation distance between UE 115-*a* and UE 115-*b*. To determine when to transmit and receive signals, the UEs 115 may perform synchronization procedures, such as SSB beam sweeping procedures.

In some cases, a synchronization procedure may also account for varying carrier frequencies at the different UEs 115. For example, a carrier frequency generator, such as an oscillator, may not be the same between UEs 115. The oscillator in UE 115-*a* may tick (e.g., oscillate) faster than the oscillator in UE 115-*b*, or vice versa. As such, UEs 115-*a* and 115-*b* may have a different concept of the same frequency. For example, UE 115-*a* may recognize 30 GHz as a lower frequency than it really is (e.g., 29.9999 GHz), and UE 115-*b* may recognize 30 GHz as a higher frequency than it really (e.g., 30.9999 GHz). A difference in the frequencies between the two UEs 115 that utilize OFDM may cause the orthogonality of the OFDM subcarriers to not be maintained which may result in a lower SNR for the received signal at the receiving UE 115. In some cases, even if the two UEs 115 are transmitting and receiving at 30 GHz, a relative movement between the two UEs 115 may create a doppler shift effect such that a frequency received by a UE 115 may be different than the originally transmitted frequency. For example, UE 115-*a* may transmit a signal to UE 115-*b* at 30 GHz while moving towards UE 115-*b*. Due to the doppler shift, UE 115-*b* may receive the signal at a slightly higher carrier frequency and this difference in frequency may cause an orthogonality problem in the OFDM subcarrier.

In some wireless communications systems, UEs 115 may rely on SSB beam sweeping for time and frequency resource synchronization. However, an SSB beam sweeping procedure may be resource intensive and may be performed infrequently (e.g., at a periodicity of 160 ms). For example, an SSB may be transmitted over multiple beams even if transmit and receive beams 210, such as beams 210-*a* and 210-*b*, have already been determined by the connected UEs 115. In some cases, UE 115-*a* may not receive each SSB transmitted by UE 115-*b* over the multiple beams 210 for time and frequency tracking, or vice versa which may result in an inefficient use of resources. The network environment or UE 115 movement may also change drastically in 160 ms and infrequent synchronization may result in unreliable transmissions. Further, some UEs 115 may not be configured to transmit SSBs. As such, improved time and frequency synchronization procedures may improve reliability in the network. In some wireless communications systems, for two UEs 115 that are connected with a chosen beam pair, such as UEs 115-a and 115-b, the UEs 115 may avoid beam sweeping for resource synchronization.

In some cases, the connected UEs 115 may perform resource synchronization by utilizing a reference signal, such as a synchronization reference signal, that is transmitted and received by the UEs 115 over the established transmit and receive beams (e.g., beams 215-a, and 215-b). The synchronization reference signal may be a sidelink UE-to-UE reference signal configured for time tracking, frequency tracking, or a combination thereof. In some cases, the information included in the PSBCHs 220 for time and frequency tracking may be received from base station 105-a. As such, the UEs 115 may not need to transmit the PSBCHs 220 for time and frequency tracking and thus the UEs 115 may use the synchronization reference signals for time and frequency synchronization.

The synchronization reference signal may be transmitted periodically, dynamically (e.g., on-demand), or semi-persistently. If the synchronization reference signal is transmitted periodically, the periodicity at which the synchronization reference signal is transmitted may be smaller than the periodicity at which S-SSBs 240 are transmitted (e.g., smaller than 160 ms) such that the synchronization reference signal may be transmitted more frequently than the S-SSB 240. If the synchronization reference signal is transmitted semi-persistently, the reference signal may be turned on and off. When the reference signal is turned on, the reference signal may be transmitted periodically. The reference signal may be turned on and off autonomously by the UE 115 transmitting the reference signal, or may be turned on or off by base station 105-a. In some cases, the synchronization reference signal may be turned on or off based on network conditions or based on the relative movement (e.g., velocity, direction) between UEs 115-a and 115-b. For example, if UEs 115-a and 115-b are not moving relative to each other, or do not meet a threshold or relative movement, the reference signal may be turned off and if the UEs 115 are moving relative to each other, or moving at a velocity that meets a preconfigured threshold relative to one another, the reference signal may be turned on.

Similarly, the reference signal may be turned on and off, on-demand, based on similar conditions. In some cases, if the reference signal is configured to be turned on and off, on-demand, a preconfigured number of reference signals may be transmitted each time the reference signal is turned on, rather than being periodically transmitted. In some cases, a base station 105 or the transmitting UE 115 may turn on the reference signal. In some cases, the receiving UE 115 may transmit to a base station 105 or to the transmitting UE 115 a request for the reference signal to be turned on, on-demand or semi-persistently. For example, base station 105-a, or UE 115-a may turn the reference signal on, on-demand, and UE 115-a may transmit the reference signal to UE 115-b a preconfigured number of times over narrow beam 215-a, such as one time, and then base station 105-a or UE 115-a may turn the reference signal off, or the reference signal may be configured to turn off after the preconfigured number of transmissions, such as one, in this example.

The reference signal may include time and frequency information that may be used by the receiving UE 115 to align time resources, frequency resources, or a combination thereof with the transmitting UE 115. The UEs 115 may then communicate over the sidelink channel based on the time synchronization, frequency synchronization, or both, determined by the synchronization reference signal.

Figure 3:
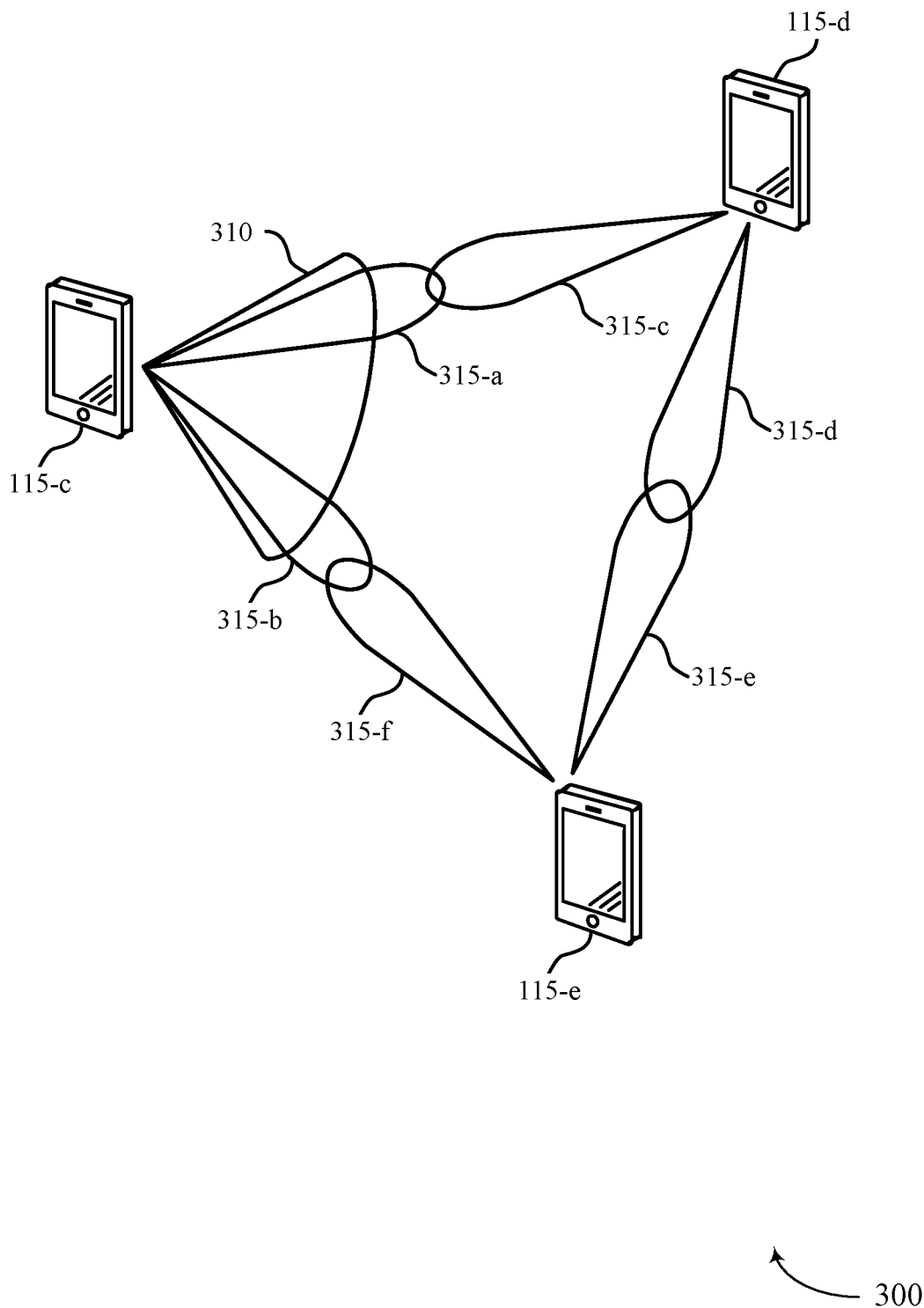

FIG. 3 illustrates an example of a wireless communications system 300 that supports sidelink synchronization signals for a connected UE in accordance with aspects of the present disclosure. The wireless communications system 300 may include UEs 115-c, 115-d, and 115-e, which may be examples of UEs 115 as described with reference to FIGS. 1 and 2. In some cases, UEs 115-c, 115-d, and 115-e may communicate with a base station as described with reference to FIGS. 1 and 2. In some cases, UEs 115-c, 115-d, and 115-e may communicate via sidelink channels and may perform resource synchronization using synchronization reference signals. Additionally or alternatively, other wireless devices, such as a base station, or some combination of UEs 115 and base stations 105 may implement a sidelink resource synchronization procedure.

In some implementations, multiple UEs 115 may communicate with each other via sidelink channels. UEs 115-c, 115-d, and 115-e may have performed a sidelink beam sweeping procedure to establish sidelink connections with one or more other UEs 115. The beam sweeping procedure, as described with reference to FIG. 2, may have established wide transmit/receive beams 310 at one or more of the UEs 115, or narrow transmit/receive beams 315 at one or more of the UEs 115, or a combination thereof, and may have established initial resource (e.g., time, frequency) synchronization. In some cases, one beam may be used to transmit or receive signals from multiple UEs 115. For example, UE 115-c may transmit signals to or receive signals from UEs 115-d or 115-e, or both over wide beam 310. Each UE 115 may be configured with narrow beams 315 that may be UE 115 specific. For example, UE 115-c and UE 115-d may communicate using beams 315-a and 315-c. UE 115-c and UE 115-e may communicate using beams 315-b and 315-f UE 115-d and UE 115-e may communicate using beams 315-d and 315-e. In some cases, beams 315-a through 315-e may each be used by the UE 115 from which the beam originates to transmit signals to another UE 115 or receive signals from another UE 115.

After the connection between UEs 115 is established, transmit/receive beams have been determined, and initial resource synchronization has been performed, network conditions may change or UEs 115 may move relative to one another, while the UEs 115 remain connected. In some cases, due to the changes in network conditions or due to the relative movement between UEs 115, the time resources, or frequency resources between one of more UEs 115 may become out of sync (e.g., unsynchronized). To re-synchronize the time and frequency resources, a transmitting UE 115 may transmit one or more sidelink synchronization reference signals to a receiving UE 115 periodically, on-demand, or semi-persistently, or a combination thereof. The synchronization reference signal may include time information, or frequency information, or both of the transmitting UE 115. In some cases, the synchronization reference signal may also include an identifier of the transmitting UE 115, such as an identifier unique to the UE 115.

In some cases, a UE 115 may transmit multiple reference signals simultaneously to one or more UEs 115. For example, UE 115-e may simultaneously transmit a sidelink synchronization reference signal to UE 115-d over beam 315-a and to UE 115-c over beam 315-f In some cases, a UE 115 may simultaneously receive multiple reference signals from one or more UEs 115. In some cases, the receiving UE 115 may receive the multiple simultaneous reference signals via a wide beam 310 (e.g., omni-beam) or a narrow beam 315. For example, UE 115-c may simultaneously receive a synchronization reference signal from UE 115-d and UE 115-*e* over wide beam 310, as wide beam 310 may be configured for communications with both UEs 115-*d* and 115-*e*. UE 115-*c* may identify which received synchronization reference signal is associated with which UE 115 based on the UE identifier included in the synchronization reference signal. UE 115-*c* may then align time resources, or frequency resources, or both for communications with UE 115-*d*, and UE 115-*e*.

Figure 4:
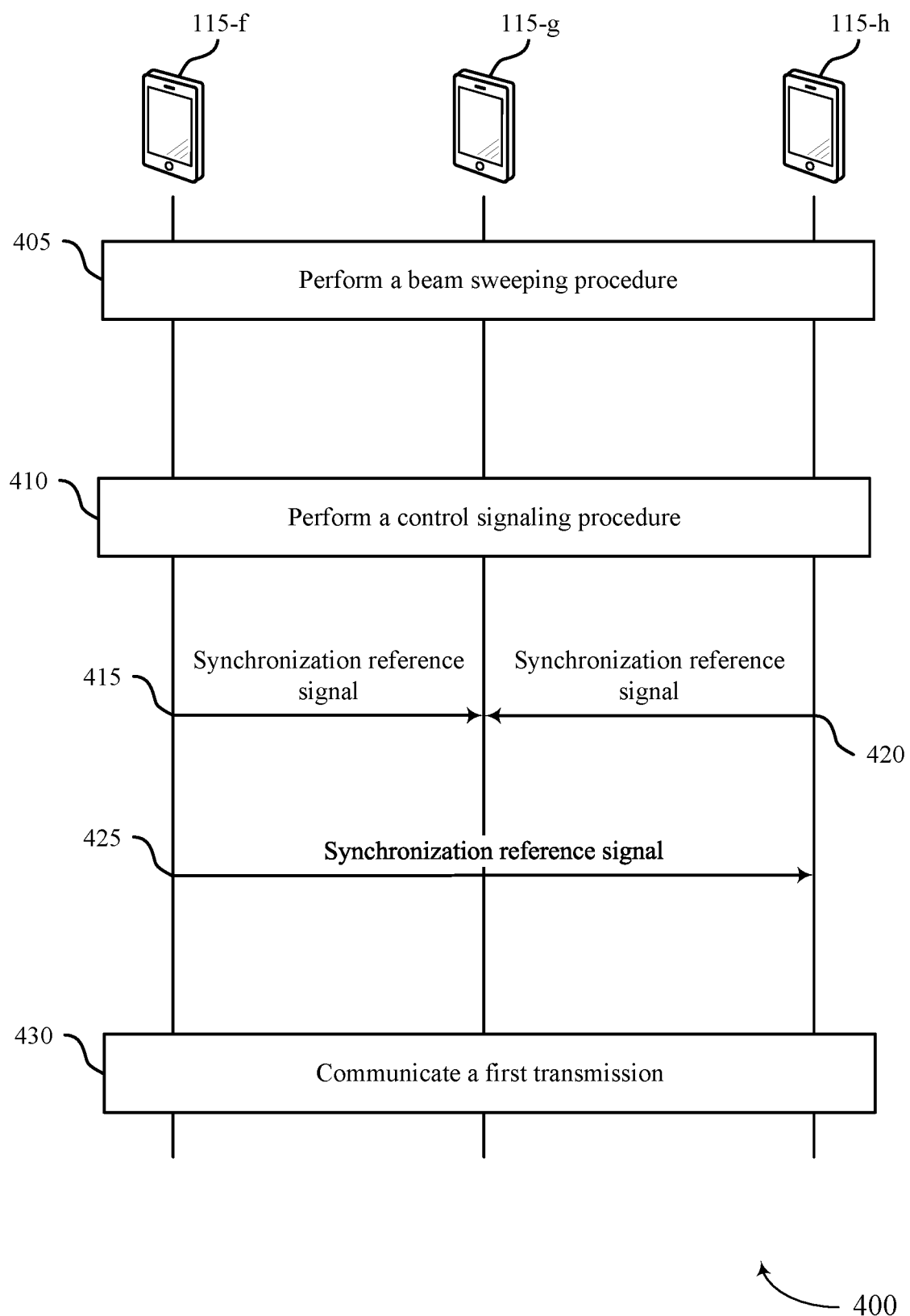
FIG. 4 illustrates an example of a process flow that supports sidelink synchronization signals for a connected UE in accordance with aspects of the present disclosure.

FIG. 4 illustrates an example of a process flow 400 that supports sidelink synchronization signals for a connected UE in accordance with aspects of the present disclosure. The process flow 400 may illustrate an example sidelink resource synchronization procedure. For example, UEs 115-*f*, 115-*g*, and 115-*h* may synchronize time and frequency resources between each other. UEs 115-*f*, 115-*g*, and 115-*h* may be examples of the corresponding wireless devices described with reference to FIGS. 1 through 4. In some cases, instead of a UE 115 implementing the resource synchronization procedure, a different type of wireless device (e.g., a base station) may perform the synchronization resource procedure. Alternative examples of the following may be implemented, where some steps are performed in a different order than described or are not performed at all. In some cases, steps may include additional features not mentioned below, or further steps may be added.

At 405, UEs 115-*f*, 115-*g*, and 115-*h* may perform a sidelink beam sweeping procedure, as described with reference to FIG. 2. In some cases, each UE 115 may participate in a beam sweeping procedure with one or more other UEs 115. For example, UEs 115-*f*, 115-*g*, and 115-*h* may communicate with each other in some combination over sidelink channels. UE 115-*f* may establish a connection with UE 115-*g*, or UE 115-*h*, or both. UE 115-*g* may establish a connection with UE 115-*f*, or UE 115-*h*, or both. UE 115-*h* may establish a connection with UE 115-*f*, or UE 115-*g*, or both. In the beam sweeping procedure, each UE 115 may determine one or more transmit/receive wide beams, or one or more transmit/receive narrow beams, or a combination thereof for communicating with one or more UEs 115.

At 410, UEs 115-*f*, 115-*g*, and 115-*h* may perform a control signaling procedure. In some cases, the control signaling may be transmitted via a physical sidelink control channel (PSCCH) which may include a sidelink control information (SCI) message. The control signaling may include information about the resource allocation of the physical sidelink shared channel (PSSCH). In some cases, a UE 115, such as UE 115-*f*, may transmit, to one or more sidelink UEs 115, control signaling indicating a periodicity of transmission of a first sidelink synchronization reference signal by UE 115-*f*. In some cases, a UE 115, such as UE 115-*g*, may receive, from one or more sidelink UEs 115, control signaling indicating a periodicity of transmission of a first sidelink synchronization reference signal by UEs 115-*f*, or 115-*h*, or both. In some cases, a UE 115, such as UE 115-*f*, may transmit, to one or more sidelink UEs 115, control signaling scheduling transmission of the first sidelink synchronization reference signal by UE 115-*f*, where the first sidelink synchronization reference signal may be received in accordance with the control signaling. In some cases, a UE 115, such as UE 115-*g*, may receive, from one or more sidelink UEs 115, control signaling scheduling transmission of the first sidelink synchronization reference signal by UEs 115-*f*, or 115-*h*, or both, where the first sidelink synchronization reference signal may be received in accordance with the control signaling.

In some cases, a UE 115, such as UE 115-*g*, may transmit control signaling requesting transmission of the first sidelink synchronization reference signal by UE 115*f*, or UE 115-*h*, or both, where the first sidelink synchronization reference signal may be received in accordance with the control signaling. In some cases, a UE 115 such as UE 115-*g* may transmit the control signaling based on the detected motion of UE 115-*f*, the detected motion of a UE 115 which UE 115-*f* is connected with, or both. In some cases, a UE 115, such as UE 115-*g*, may receive control signaling from one or more UEs 115-*f*, or 115-*h* indicating a semi-persistent transmission schedule for transmission of the first sidelink synchronization reference signal by UEs 115-*f*, or 115-*h*, or both.

At 415 and 420, UE 115-*f* and UE 115-*h* may simultaneously transmit a sidelink synchronization reference signal to UE 115-*g*. In some cases, UE 115-*g* may simultaneously receive the sidelink synchronization reference signals via a wide receive beam that was previously determined in a beam sweeping procedure with UEs 115-*f* and 115-*h*. UEs 115-*f* and 115-*h* may also be configured to simultaneously receive synchronization reference signals via a previously configure wide beam. In some cases, UE 115-*g* may receive synchronization reference signals from UEs 115-*f* and 115-*h* at different times. In such cases, UE 115-*g* may receive each synchronization reference signal over a narrow beam that was selected to communicate with the UE 115 that transmitted the synchronization reference signal. In some cases, each synchronization reference signal may indicate an identifier of the UE 115 that sent the reference signal, where the identifier may differ from an identifier of another UE 115. The identifier included in the synchronization reference signal may be used by the receiving UE 115 to determine which UE 115 the reference signal is associated with. In some cases, a UE 115 may simultaneously transmit multiple synchronization reference signals to multiple UEs 115. For example, UE 115-*f* may transmit synchronization reference signals to UE 115-*g*, at 420, and to UE 115-*h*, at 425, at different times, or at the same time.

At 430, UEs 115-*f*, 115-*g*, and 115-*g* may communicate with each other. In some cases, one or more of the UEs 115 may communicate a first transmission via the sidelink channel based on time synchronization, frequency synchronization, or both, determined using the first sidelink synchronization reference signal to one or more other UEs 115.

Figure 5:
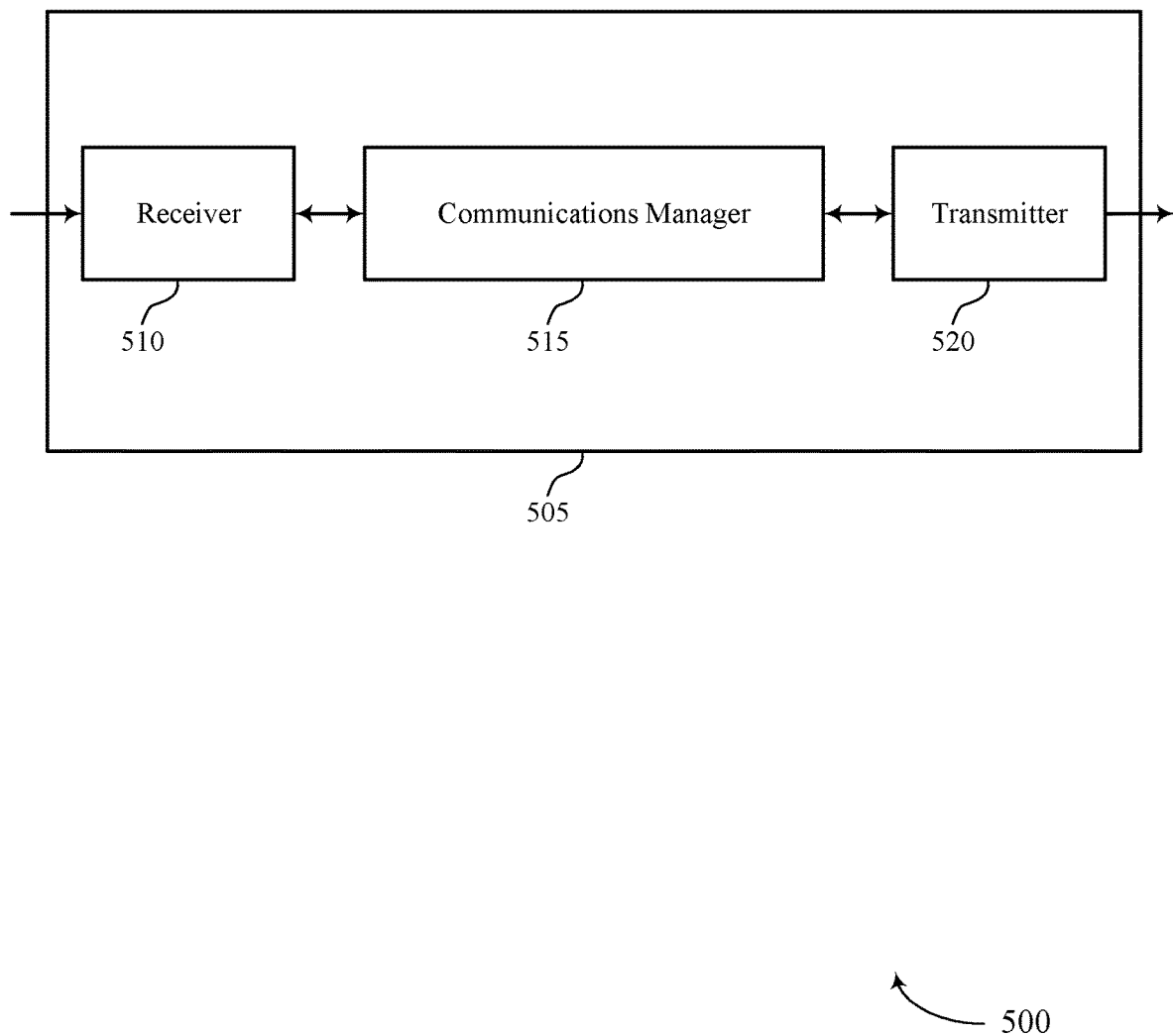
FIGS. 5 and 6 show block diagrams of devices that support sidelink synchronization signals for a connected UE in accordance with aspects of the present disclosure.

FIG. 5 shows a block diagram 500 of a device 505 that supports sidelink synchronization signals for a connected UE in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to sidelink synchronization signals for a connected UE, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may perform a beam sweep procedure with a second UE to identify a receive beam to use for communication with the second UE over a sidelink channel, receive, via the sidelink channel, a first sidelink synchronization reference signal from the second UE using the receive beam identified in the beam sweep procedure, and communicate a first transmission via the sidelink channel based on time synchronization, frequency synchronization, or both, determined using the first sidelink synchronization reference signal. The communications manager 515 may also perform a beam sweep procedure with a second UE to identify a transmission beam to use for communication with the second UE over a sidelink channel, transmit, via the sidelink channel, a first sidelink synchronization reference signal to the second UE using the transmission beam identified in the beam sweep procedure, and communicate a first transmission via the sidelink channel using the transmission beam based on time synchronization, frequency synchronization, or both, corresponding to the first sidelink synchronization reference signal. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

The communications manager 515 as described herein may be implemented to realize one or more potential advantages. One implementation may allow the device 505 to more efficiently synchronize resources between multiple devices 505. For example, a device 505 may transmit or receive synchronization reference signals to one or more other devices 505 to synchronize time and frequency resources.

By including or configuring the communications manager 515 in accordance with examples as described herein, the device 505 (e.g., a processor controlling or otherwise coupled to the receiver 510, the transmitter 520, the communications manager 515, or a combination thereof) may support techniques for more efficient utilization of communication resources and reduced power consumption based on reducing a number of beams over which an SSB is transmitted during a synchronization process.

Figure 6:
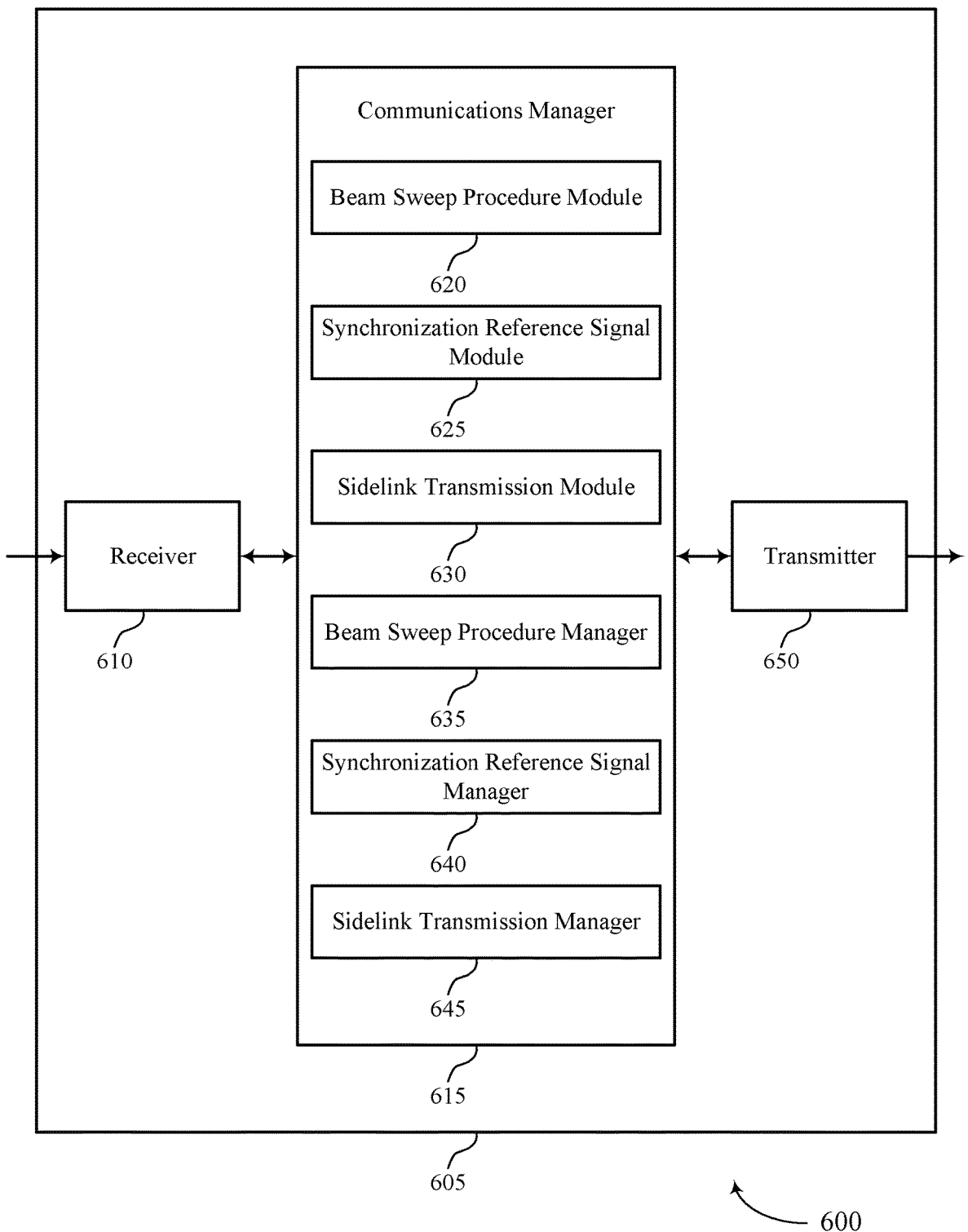

FIG. 6 shows a block diagram 600 of a device 605 that supports sidelink synchronization signals for a connected UE in accordance with aspects of the present disclosure. The device 605 may be an example of aspects of a device 505, or a UE 115 as described herein. The device 605 may include a receiver 610, a communications manager 615, and a transmitter 650. The device 605 may also include a processor. Each of these components may be in communication with one another (e.g., via one or more buses).

The receiver 610 may receive information such as packets, user data, or control information associated with various information channels (e.g., control channels, data channels, and information related to sidelink synchronization signals for a connected UE, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a beam sweep procedure module 620, a synchronization reference signal module 625, a sidelink transmission module 630, a beam sweep procedure manager 635, a synchronization reference signal manager 640, and a sidelink transmission manager 645. The communications manager 615 may be an example of aspects of the communications manager 810 described herein.

The beam sweep procedure module 620 may perform a beam sweep procedure with a second UE to identify a receive beam to use for communication with the second UE over a sidelink channel. The synchronization reference signal module 625 may receive, via the sidelink channel, a first sidelink synchronization reference signal from the second UE using the receive beam identified in the beam sweep procedure. The sidelink transmission module 630 may communicate a first transmission via the sidelink channel based on time synchronization, frequency synchronization, or both, determined using the first sidelink synchronization reference signal.

The beam sweep procedure manager 635 may perform a beam sweep procedure with a second UE to identify a transmission beam to use for communication with the second UE over a sidelink channel. The synchronization reference signal manager 640 may transmit, via the sidelink channel, a first sidelink synchronization reference signal to the second UE using the transmission beam identified in the beam sweep procedure. The sidelink transmission manager 645 may communicate a first transmission via the sidelink channel using the transmission beam based on time synchronization, frequency synchronization, or both, corresponding to the first sidelink synchronization reference signal.

The transmitter 650 may transmit signals generated by other components of the device 605. In some examples, the transmitter 650 may be collocated with a receiver 610 in a transceiver module. For example, the transmitter 650 may be an example of aspects of the transceiver 820 described with reference to FIG. 8. The transmitter 650 may utilize a single antenna or a set of antennas.

Figure 7:
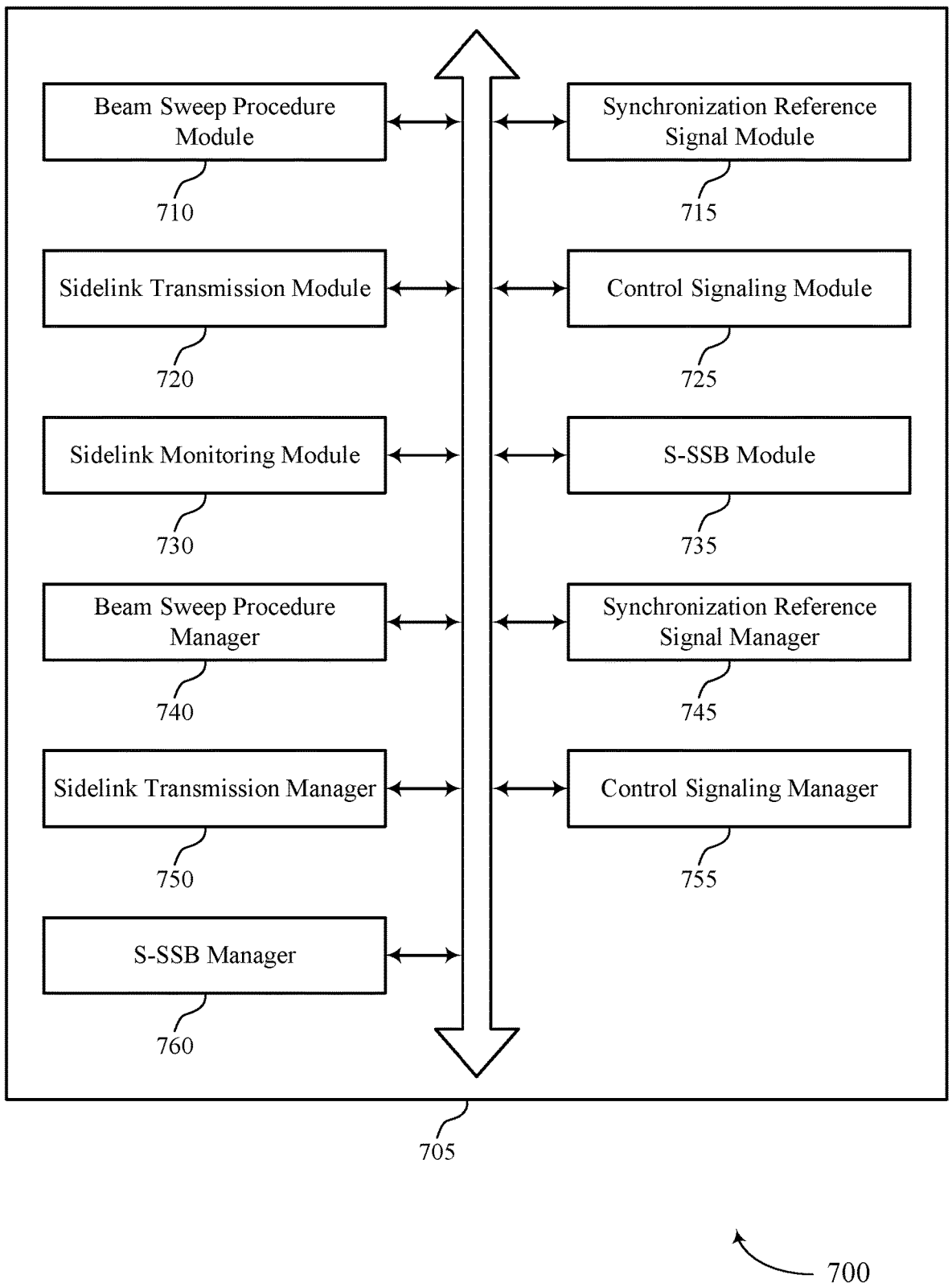
FIG. 7 shows a block diagram of a communications manager that supports sidelink synchronization signals for a connected UE in accordance with aspects of the present disclosure.

FIG. 7 shows a block diagram 700 of a communications manager 705 that supports sidelink synchronization signals for a connected UE in accordance with aspects of the present disclosure. The communications manager 705 may be an example of aspects of a communications manager 515, a communications manager 615, or a communications manager 810 described herein. The communications manager 705 may include a beam sweep procedure module 710, a synchronization reference signal module 715, a sidelink transmission module 720, a control signaling module 725, a sidelink monitoring module 730, an S-SSB module 735, a beam sweep procedure manager 740, a synchronization reference signal manager 745, a sidelink transmission manager 750, a control signaling manager 755, and an S-SSB manager 760. Each of these modules may communicate, directly or indirectly, with one another (e.g., via one or more buses).

The beam sweep procedure module 710 may perform a beam sweep procedure with a second UE to identify a receive beam to use for communication with the second UE over a sidelink channel. The synchronization reference signal module 715 may receive, via the sidelink channel, a first sidelink synchronization reference signal from the second UE using the receive beam identified in the beam sweep procedure. The sidelink transmission module 720 may communicate a first transmission via the sidelink channel based on time synchronization, frequency synchronization, or both, determined using the first sidelink synchronization reference signal.

The control signaling module 725 may receive control signaling indicating a periodicity of transmission of the first sidelink synchronization reference signal. The sidelink monitoring module 730 may monitor the sidelink channel for a transmission of the first sidelink synchronization reference signal using the receive beam based on the periodicity. In some examples, the control signaling module 725 may receive control signaling scheduling transmission of the first sidelink synchronization reference signal, where the first sidelink synchronization reference signal is received in accordance with the control signaling. In some examples, the control signaling module 725 may transmit control signaling requesting transmission of the first sidelink synchronization reference signal by the second UE, where the first sidelink synchronization reference signal is received in accordance with the control signaling. In some examples, the control signaling module 725 may transmit the control signaling based on detected motion of the first UE, the second UE, or both. In some examples, the control signaling module 725 may receive control signaling indicating a semi-persistent transmission schedule for transmission of the first sidelink synchronization reference signal by the second UE. In some examples, the sidelink monitoring module 730 may monitor the sidelink channel for a transmission of the first sidelink synchronization reference signal using the receive beam based on the semi-persistent transmission schedule.

In some examples, the synchronization reference signal module 715 may receive, via the sidelink channel, a second synchronization reference signal from a third UE using the receive beam. In some examples, the sidelink transmission module 720 may communicate a second transmission via the sidelink channel based on time synchronization, frequency synchronization, or both, determined using the second synchronization reference signal. In some examples, the synchronization reference signal module 715 may receive the second synchronization reference signal that indicates an identifier of the third UE that differs from an identifier of the second UE indicated in the first sidelink synchronization reference signal.

In some cases, a periodicity of transmission of the first sidelink synchronization reference signal is shorter than a periodicity of transmission of the sidelink SSB transmission. In some examples, the sidelink transmission module 720 may communicate the first transmission via the sidelink channel using a beam having a beam width that is narrower than the receive beam. In some cases, the first and second sidelink synchronization reference signals are received concurrently or simultaneously. The S-SSB module 735 may receive a sidelink SSB transmission from the second UE.

The beam sweep procedure manager 740 may perform a beam sweep procedure with a second UE to identify a transmission beam to use for communication with the second UE over a sidelink channel. The synchronization reference signal manager 745 may transmit, via the sidelink channel, a first sidelink synchronization reference signal to the second UE using the transmission beam identified in the beam sweep procedure. The sidelink transmission manager 750 may communicate a first transmission via the sidelink channel using the transmission beam based on time synchronization, frequency synchronization, or both, corresponding to the first sidelink synchronization reference signal.

In some examples, the synchronization reference signal manager 745 may transmit the first sidelink synchronization reference signal that indicates an identifier of the first UE. The control signaling manager 755 may transmit control signaling indicating a periodicity of transmission of the first sidelink synchronization reference signal, where the first sidelink synchronization reference signal is transmitted in accordance with the periodicity. In some examples, the control signaling manager 755 may transmit control signaling scheduling transmission of the first sidelink synchronization reference signal, where the first sidelink synchronization reference signal is transmitted in accordance with the control signaling.

In some examples, the control signaling manager 755 may receive control signaling requesting transmission of the first sidelink synchronization reference signal, where the first sidelink synchronization reference signal is transmitted in accordance with the control signaling. In some examples, the control signaling manager 755 may transmit control signaling indicating a semi-persistent transmission schedule for transmission of the first sidelink synchronization reference signal, where the first sidelink synchronization reference signal is transmitted in accordance with the control signaling.

The S-SSB manager 760 may transmit a sidelink SSB transmission. In some cases, a periodicity of transmission of the first sidelink synchronization reference signal is shorter than a periodicity of transmission of the sidelink SSB transmission.

Figure 8:
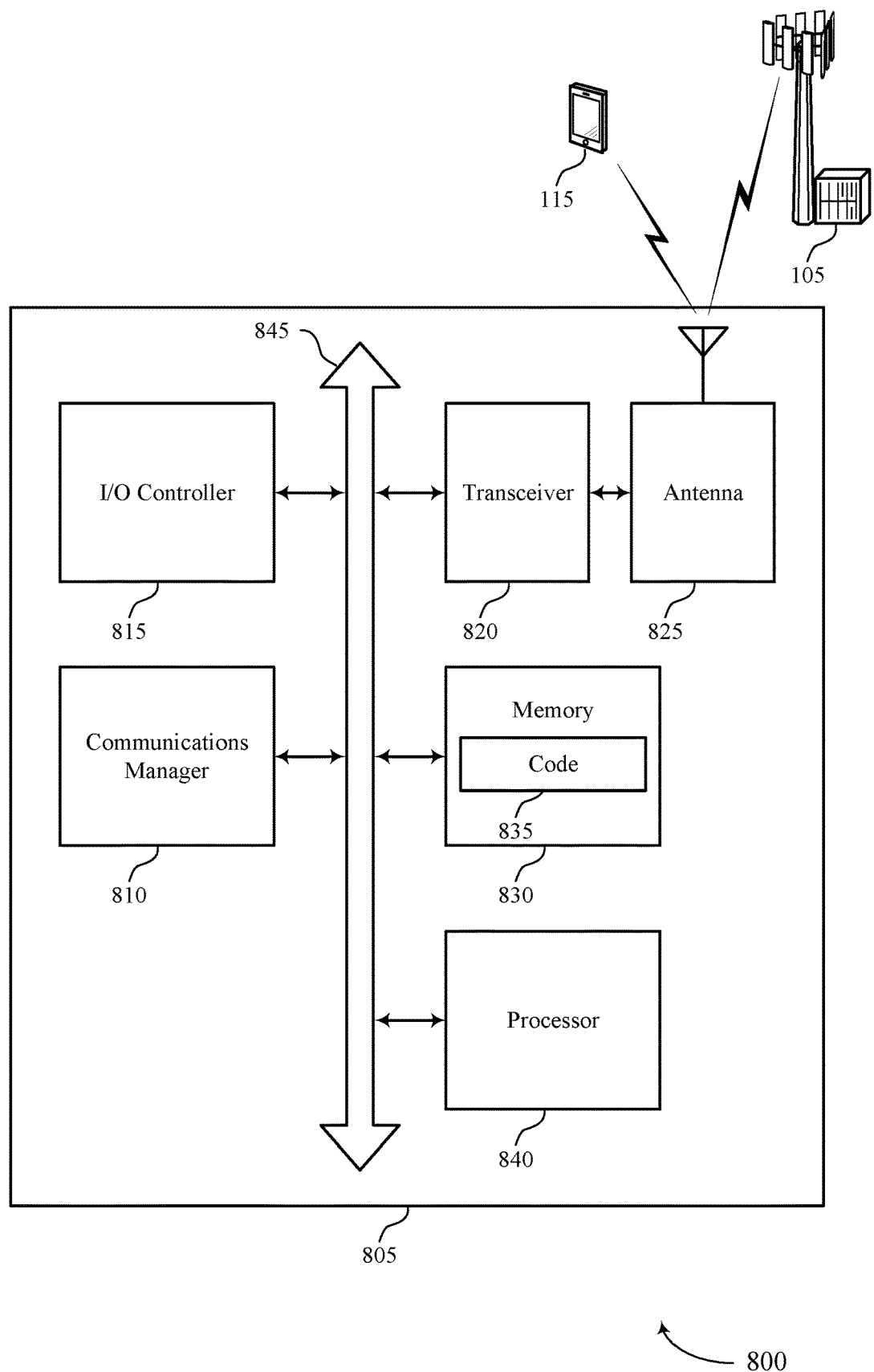
FIG. 8 shows a diagram of a system including a device that supports sidelink synchronization signals for a connected UE in accordance with aspects of the present disclosure.

FIG. 8 shows a diagram of a system 800 including a device 805 that supports sidelink synchronization signals for a connected UE in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may perform a beam sweep procedure with a second UE to identify a receive beam to use for communication with the second UE over a sidelink channel, receive, via the sidelink channel, a first sidelink synchronization reference signal from the second UE using the receive beam identified in the beam sweep procedure, and communicate a first transmission via the sidelink channel based on time synchronization, frequency synchronization, or both, determined using the first sidelink synchronization reference signal. The communications manager 810 may also perform a beam sweep procedure with a second UE to identify a transmission beam to use for communication with the second UE over a sidelink channel, transmit, via the sidelink channel, a first sidelink synchronization reference signal to the second UE using the transmission beam identified in the beam sweep procedure, and communicate a first transmission via the sidelink channel using the transmission beam based on time synchronization, frequency synchronization, or both, corresponding to the first sidelink synchronization reference signal.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting sidelink synchronization signals for a connected UE).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

By including or configuring the communications manager 810 in accordance with examples described herein, the device 805 may support techniques for increased reliability and efficiency in the synchronization of resources because an SSB does not have to be transmitted over multiple beams each time the device 805 performs a resource synchronization procedure.

Figure 9:
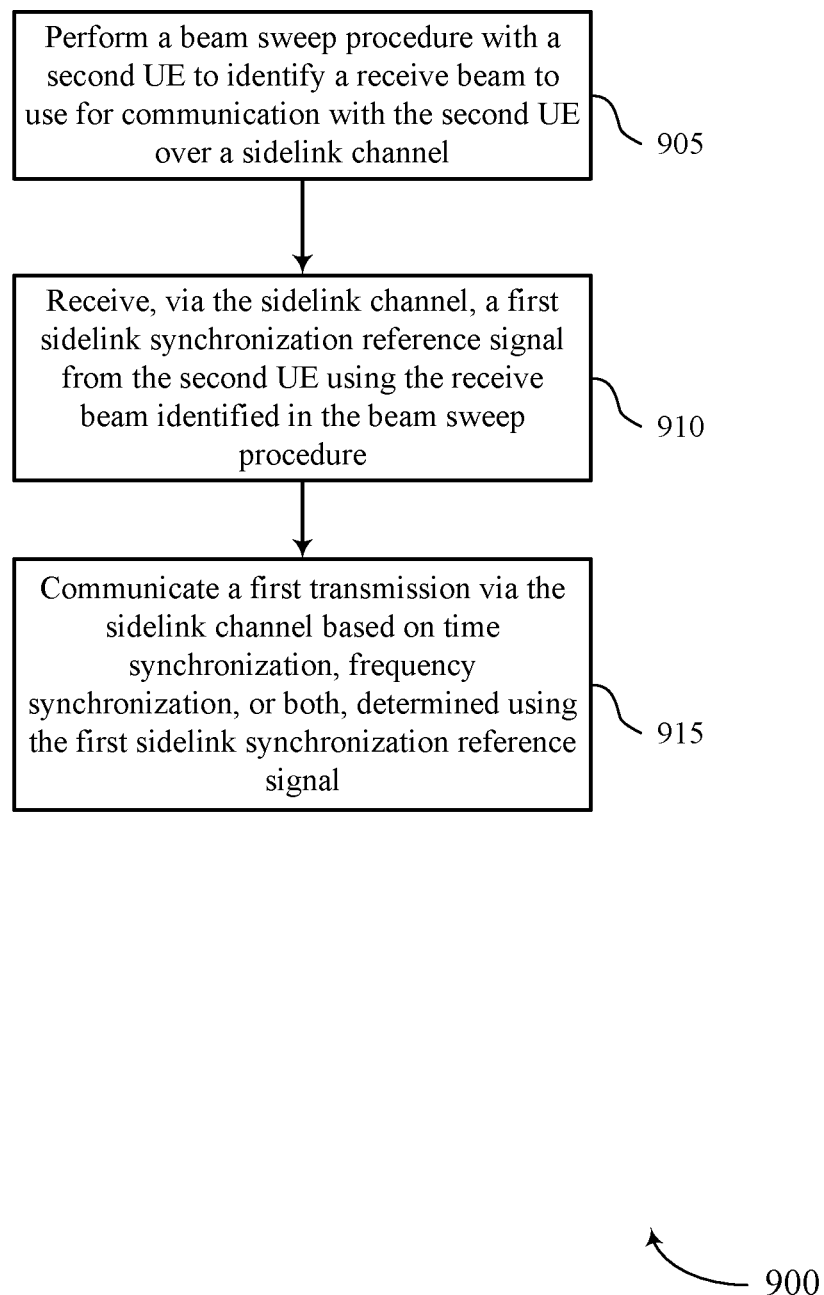
FIGS. 9 through 12 show flowcharts illustrating methods that support sidelink synchronization signals for a connected UE in accordance with aspects of the present disclosure.

FIG. 9 shows a flowchart illustrating a method 900 that supports sidelink synchronization signals for a connected UE in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may perform a beam sweep procedure with a second UE to identify a receive beam to use for communication with the second UE over a sidelink channel. The operations of 905 may be performed according to the methods described herein. In some examples, aspects of the operations of 905 may be performed by a beam sweep procedure module as described with reference to FIGS. 5 through 8.

At 910, the UE may receive, via the sidelink channel, a first sidelink synchronization reference signal from the second UE using the receive beam identified in the beam sweep procedure. The operations of 910 may be performed according to the methods described herein. In some examples, aspects of the operations of 910 may be performed by a synchronization reference signal module as described with reference to FIGS. 5 through 8.

At 915, the UE may communicate a first transmission via the sidelink channel based on time synchronization, frequency synchronization, or both, determined using the first sidelink synchronization reference signal. The operations of 915 may be performed according to the methods described herein. In some examples, aspects of the operations of 915 may be performed by a sidelink transmission module as described with reference to FIGS. 5 through 8.

Figure 10:
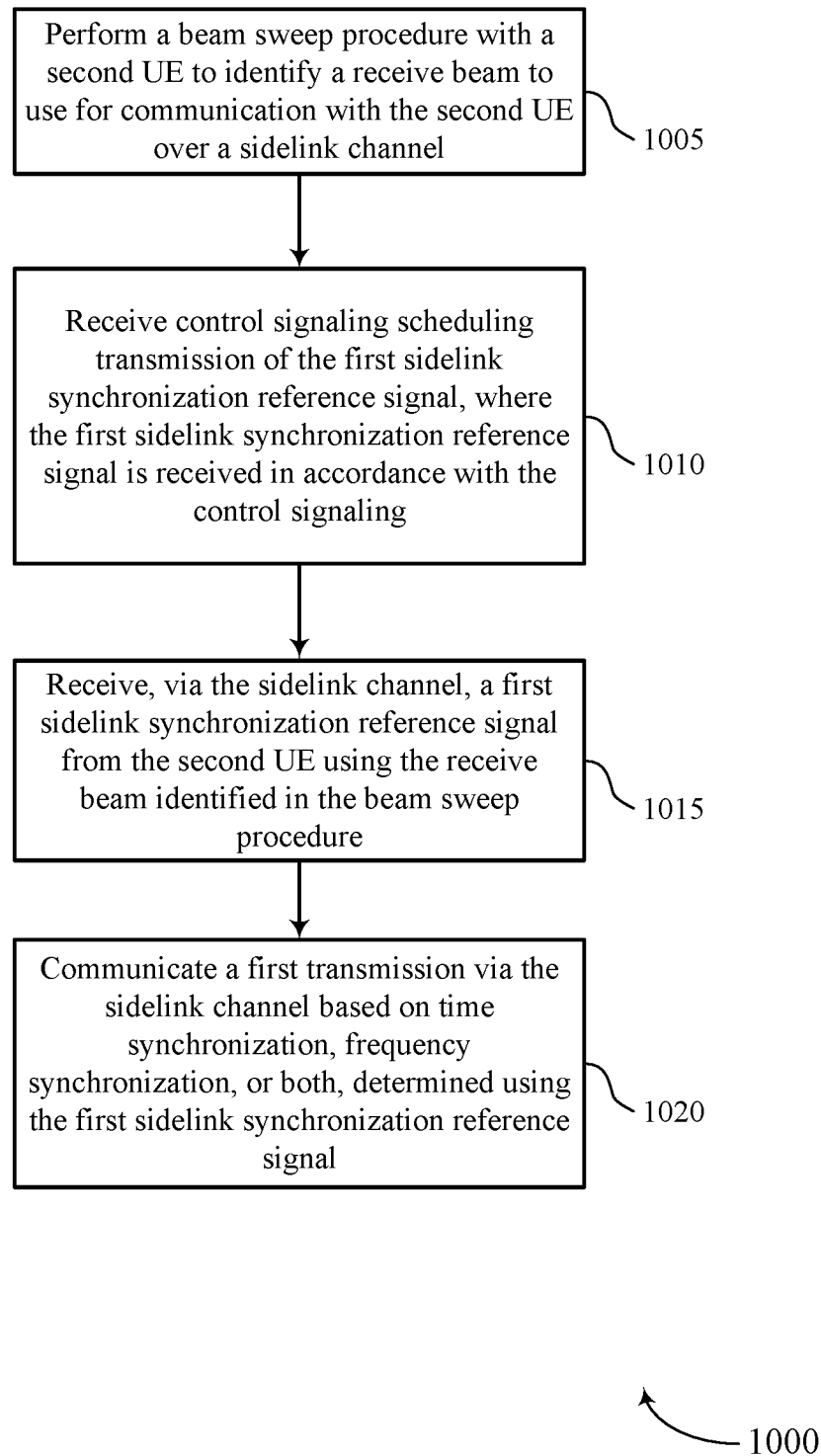

FIG. 10 shows a flowchart illustrating a method 1000 that supports sidelink synchronization signals for a connected UE in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may perform a beam sweep procedure with a second UE to identify a receive beam to use for communication with the second UE over a sidelink channel. The operations of 1005 may be performed according to the methods described herein. In some examples, aspects of the operations of 1005 may be performed by a beam sweep procedure module as described with reference to FIGS. 5 through 8.

At 1010, the UE may receive control signaling scheduling transmission of the first sidelink synchronization reference signal, where the first sidelink synchronization reference signal is received in accordance with the control signaling. The operations of 1010 may be performed according to the methods described herein. In some examples, aspects of the operations of 1010 may be performed by a control signaling module as described with reference to FIGS. 5 through 8.

At 1015, the UE may receive, via the sidelink channel, a first sidelink synchronization reference signal from the second UE using the receive beam identified in the beam sweep procedure. The operations of 1015 may be performed according to the methods described herein. In some examples, aspects of the operations of 1015 may be performed by a synchronization reference signal module as described with reference to FIGS. 5 through 8.

At 1020, the UE may communicate a first transmission via the sidelink channel based on time synchronization, frequency synchronization, or both, determined using the first sidelink synchronization reference signal. The operations of 1020 may be performed according to the methods described herein. In some examples, aspects of the operations of 1020 may be performed by a sidelink transmission module as described with reference to FIGS. 5 through 8.

Figure 11:
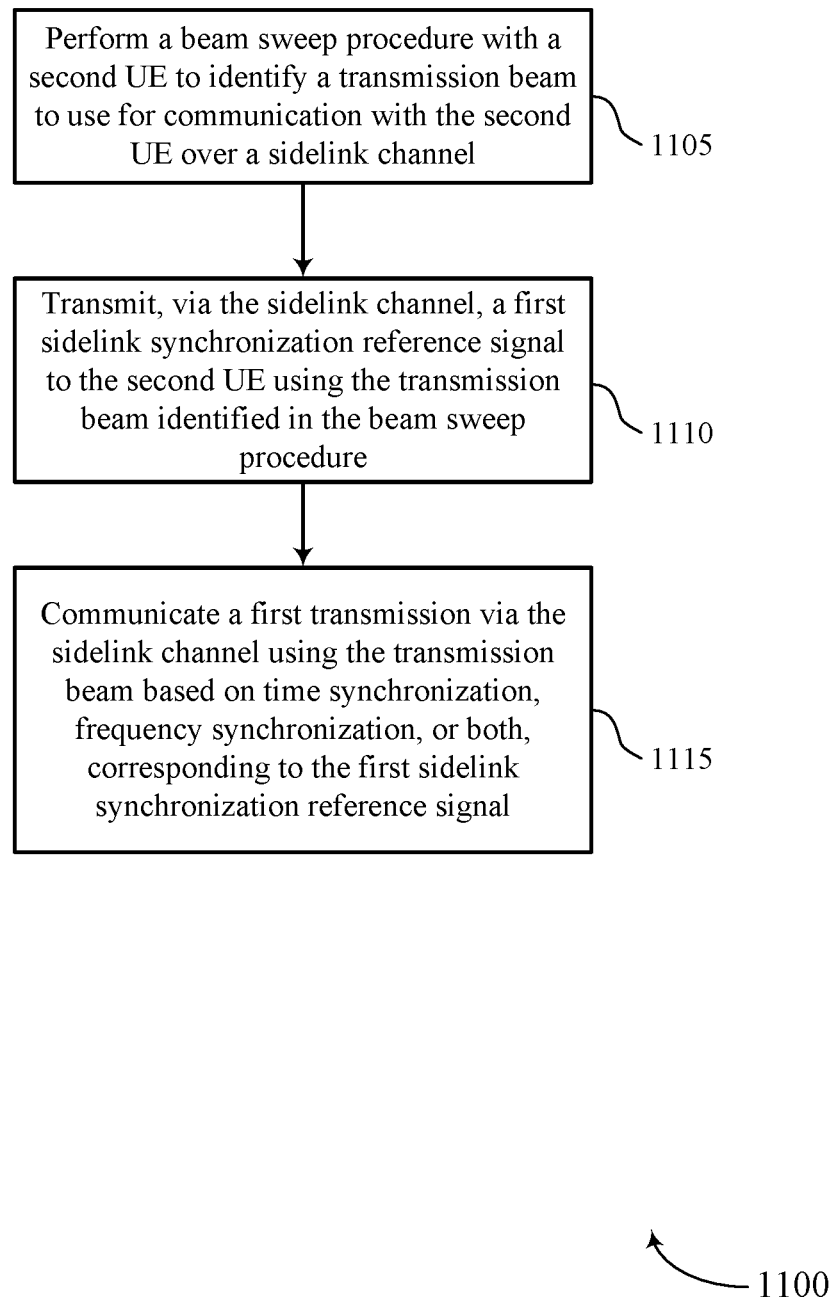

FIG. 11 shows a flowchart illustrating a method 1100 that supports sidelink synchronization signals for a connected UE in accordance with aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1105, the UE may perform a beam sweep procedure with a second UE to identify a transmission beam to use for communication with the second UE over a sidelink channel. The operations of 1105 may be performed according to the methods described herein. In some examples, aspects of the operations of 1105 may be performed by a beam sweep procedure manager as described with reference to FIGS. 5 through 8.

At 1110, the UE may transmit, via the sidelink channel, a first sidelink synchronization reference signal to the second UE using the transmission beam identified in the beam sweep procedure. The operations of 1110 may be performed according to the methods described herein. In some examples, aspects of the operations of 1110 may be performed by a synchronization reference signal manager as described with reference to FIGS. 5 through 8.

At 1115, the UE may communicate a first transmission via the sidelink channel using the transmission beam based on time synchronization, frequency synchronization, or both, corresponding to the first sidelink synchronization reference signal. The operations of 1115 may be performed according to the methods described herein. In some examples, aspects of the operations of 1115 may be performed by a sidelink transmission manager as described with reference to FIGS. 5 through 8.

Figure 12:
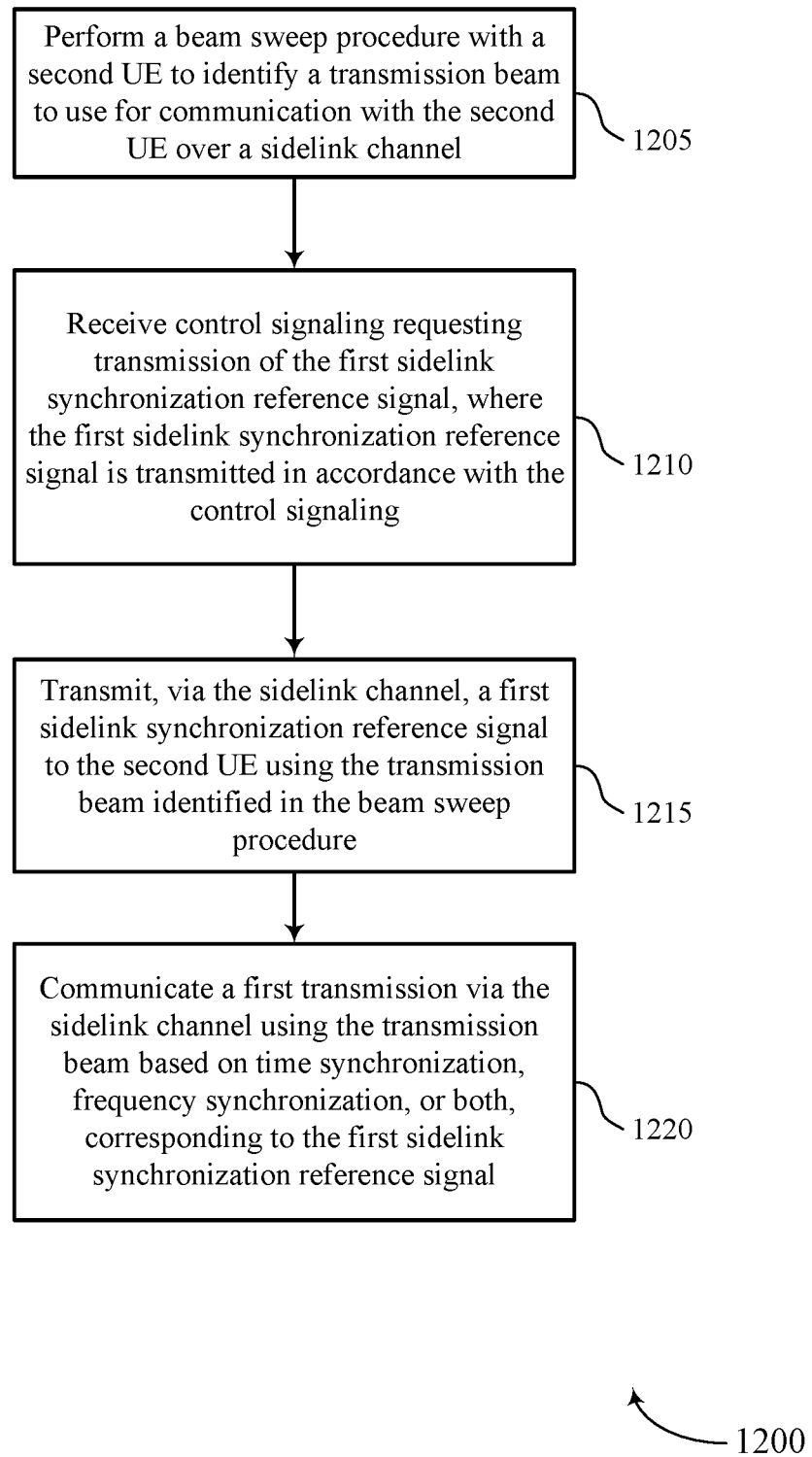

FIG. 12 shows a flowchart illustrating a method 1200 that supports sidelink synchronization signals for a connected UE in accordance with aspects of the present disclosure. The operations of method 1200 may be implemented by a UE 115 or its components as described herein. For example, the operations of method 1200 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1205, the UE may perform a beam sweep procedure with a second UE to identify a transmission beam to use for communication with the second UE over a sidelink channel. The operations of 1205 may be performed according to the methods described herein. In some examples, aspects of the operations of 1205 may be performed by a beam sweep procedure manager as described with reference to FIGS. 5 through 8.

At 1210, the UE may receive control signaling requesting transmission of the first sidelink synchronization reference signal, where the first sidelink synchronization reference signal is transmitted in accordance with the control signaling. The operations of 1210 may be performed according to the methods described herein. In some examples, aspects of the operations of 1210 may be performed by a control signaling manager as described with reference to FIGS. 5 through 8.

At 1215, the UE may transmit, via the sidelink channel, a first sidelink synchronization reference signal to the second UE using the transmission beam identified in the beam sweep procedure. The operations of 1215 may be performed according to the methods described herein. In some examples, aspects of the operations of 1215 may be performed by a synchronization reference signal manager as described with reference to FIGS. 5 through 8.

At 1220, the UE may communicate a first transmission via the sidelink channel using the transmission beam based on time synchronization, frequency synchronization, or both, corresponding to the first sidelink synchronization reference signal. The operations of 1220 may be performed according to the methods described herein. In some examples, aspects of the operations of 1220 may be performed by a sidelink transmission manager as described with reference to FIGS. 5 through 8.

The following provides an overview of aspects of the present disclosure:

Aspect 1: A method for wireless communications by a first UE, comprising: performing a beam sweep procedure with a second UE to identify a receive beam to use for communication with the second UE over a sidelink channel; receiving, via the sidelink channel, a first sidelink synchronization reference signal from the second UE using the receive beam identified in the beam sweep procedure; and communicating a first transmission via the sidelink channel based at least in part on time synchronization, frequency synchronization, or both, determined using the first sidelink synchronization reference signal.

Aspect 2: The method of aspect 1, further comprising: receiving control signaling indicating a periodicity of transmission of the first sidelink synchronization reference signal by the second UE; and monitoring the sidelink channel for a transmission of the first sidelink synchronization reference signal using the receive beam based at least in part on the periodicity.

Aspect 3: The method of any of aspects 1 through 2, further comprising: receiving control signaling scheduling transmission of the first sidelink synchronization reference signal, wherein the first sidelink synchronization reference signal is received in accordance with the control signaling.

Aspect 4: The method of any of aspects 1 through 2, further comprising: transmitting control signaling requesting transmission of the first sidelink synchronization reference signal, wherein the first sidelink synchronization reference signal is received in accordance with the control signaling.

Aspect 5: The method of aspect 4, wherein transmitting the control signaling comprises: transmitting the control signaling based at least in part on detected motion of the first UE, the second UE, or both.

Aspect 6: The method of any of aspects 1 through 5, further comprising: receiving control signaling indicating a semi-persistent transmission schedule for transmission of the first sidelink synchronization reference signal by the second UE; and monitoring the sidelink channel for a transmission of the first sidelink synchronization reference signal using the receive beam based at least in part on the semi-persistent transmission schedule.

Aspect 7: The method of any of aspects 1 through 6, further comprising: receiving, via the sidelink channel, a second synchronization reference signal from a third UE using the receive beam; and communicating a second transmission via the sidelink channel based at least in part on time synchronization, frequency synchronization, or both, determined using the second synchronization reference signal.

Aspect 8: The method of aspect 7, wherein receiving the second synchronization reference signal comprises: receiving the second synchronization reference signal that indicates an identifier of the third UE that differs from an identifier of the second UE indicated in the first sidelink synchronization reference signal.

Aspect 9: The method of any of aspects 7 through 8, wherein communicating the first transmission via the sidelink channel comprises: communicating the first transmission via the sidelink channel using a beam having a beam width that is narrower than the receive beam.

Aspect 10: The method of any of aspects 7 through 9, wherein the first and second sidelink synchronization reference signals are received concurrently or simultaneously.

Aspect 11: The method of any of aspects 1 through 10, further comprising: receiving a sidelink synchronization signal block transmission from the second UE.

Aspect 12: The method of aspect 11, wherein a periodicity of transmission of the first sidelink synchronization reference signal is shorter than a periodicity of transmission of the sidelink synchronization signal block transmission.

Aspect 13: A method for wireless communications by a first UE, comprising: performing a beam sweep procedure with a second UE to identify a transmission beam to use for communication with the second UE over a sidelink channel; transmitting, via the sidelink channel, a first sidelink synchronization reference signal to the second UE using the transmission beam identified in the beam sweep procedure; and communicating a first transmission via the sidelink channel using the transmission beam based at least in part on time synchronization, frequency synchronization, or both, corresponding to the first sidelink synchronization reference signal.

Aspect 14: The method of aspect 13, further comprising: transmitting control signaling indicating a periodicity of transmission of the first sidelink synchronization reference signal, wherein the first sidelink synchronization reference signal is transmitted in accordance with the periodicity.

Aspect 15: The method of any of aspects 13 through 14, further comprising: transmitting control signaling scheduling transmission of the first sidelink synchronization reference signal, wherein the first sidelink synchronization reference signal is transmitted in accordance with the control signaling.

Aspect 16: The method of any of aspects 13 through 14, further comprising: receiving control signaling requesting transmission of the first sidelink synchronization reference signal, wherein the first sidelink synchronization reference signal is transmitted in accordance with the control signaling.

Aspect 17: The method of any of aspects 13 through 16, further comprising: transmitting control signaling indicating a semi-persistent transmission schedule for transmission of the first sidelink synchronization reference signal, wherein the first sidelink synchronization reference signal is transmitted in accordance with the control signaling.

Aspect 18: The method of any of aspects 13 through 17, wherein transmitting the first sidelink synchronization reference signal comprises: transmitting the first sidelink synchronization reference signal that indicates an identifier of the first UE.

Aspect 19: The method of any of aspects 13 through 18, further comprising: transmitting a sidelink synchronization signal block transmission.

Aspect 20: The method of aspect 19, wherein a periodicity of transmission of the first sidelink synchronization reference signal is shorter than a periodicity of transmission of the sidelink synchronization signal block transmission.

Aspect 21: An apparatus for wireless communications by a first UE, comprising a processor; memory coupled with the processor; and instructions stored in the memory and executable by the processor to cause the apparatus to perform a method of any of aspects 1 through 12.

Aspect 22: An apparatus for wireless communications by a first UE, comprising at least one means for performing a method of any of aspects 1 through 12.

Aspect 23: A non-transitory computer-readable medium storing code for wireless communications by a first UE, the code comprising instructions executable by a processor to perform a method of any of aspects 1 through 12.

Aspect 24: An apparatus for wireless communications by a first UE, comprising a processor; memory coupled with the processor; and instructions stored in the memory and executable by the processor to cause the apparatus to perform a method of any of aspects 13 through 20.

Aspect 25: An apparatus for wireless communications by a first UE, comprising at least one means for performing a method of any of aspects 13 through 20.

Aspect 26: A non-transitory computer-readable medium storing code for wireless communications by a first UE, the code comprising instructions executable by a processor to perform a method of any of aspects 13 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications by a first user equipment (UE), comprising:
   a processor,
   memory coupled with the processor; and
   instructions stored in the memory and executable by the processor to cause the apparatus to:
      perform a beam sweep procedure with a second UE to identify a receive beam to use for communication with the second UE over a sidelink channel;
      receive, via the sidelink channel, a first sidelink synchronization reference signal from the second UE using the receive beam identified in the beam sweep procedure; and
      communicate a first transmission via the sidelink channel based at least in part on time synchronization, frequency synchronization, or both, determined using the first sidelink synchronization reference signal.

2. The apparatus of claim 1, wherein the instructions are further executable by the processor to cause the apparatus to:
   receive control signaling indicating a periodicity of transmission of the first sidelink synchronization reference signal by the second UE; and monitor the sidelink channel for a transmission of the first sidelink synchronization reference signal using the receive beam based at least in part on the periodicity.

3. The apparatus of claim 1, wherein the instructions are further executable by the processor to cause the apparatus to:
receive control signaling scheduling transmission of the first sidelink synchronization reference signal, wherein the first sidelink synchronization reference signal is received in accordance with the control signaling.

4. The apparatus of claim 1, wherein the instructions are further executable by the processor to cause the apparatus to:
transmit control signaling requesting transmission of the first sidelink synchronization reference signal, wherein the first sidelink synchronization reference signal is received in accordance with the control signaling.

5. The apparatus of claim 4, wherein the instructions to transmit the control signaling are executable by the processor to cause the apparatus to:
transmit the control signaling based at least in part on detected motion of the first UE, the second UE, or both.

6. The apparatus of claim 1, wherein the instructions are further executable by the processor to cause the apparatus to:
receive control signaling indicating a semi-persistent transmission schedule for transmission of the first sidelink synchronization reference signal by the second UE; and
monitor the sidelink channel for a transmission of the first sidelink synchronization reference signal using the receive beam based at least in part on the semi-persistent transmission schedule.

7. The apparatus of claim 1, wherein the instructions are further executable by the processor to cause the apparatus to:
receive, via the sidelink channel, a second synchronization reference signal from a third UE using the receive beam; and
communicate a second transmission via the sidelink channel based at least in part on time synchronization, frequency synchronization, or both, determined using the second synchronization reference signal.

8. The apparatus of claim 7, wherein the instructions to receive the second synchronization reference signal are executable by the processor to cause the apparatus to:
receive the second synchronization reference signal that indicates an identifier of the third UE that differs from an identifier of the second UE indicated in the first sidelink synchronization reference signal.

9. The apparatus of claim 7, wherein the instructions to communicate the first transmission via the sidelink channel are executable by the processor to cause the apparatus to:
communicate the first transmission via the sidelink channel using a beam having a beam width that is narrower than the receive beam.

10. The apparatus of claim 7, wherein the first and second sidelink synchronization reference signals are received concurrently or simultaneously.

11. The apparatus of claim 1, wherein the instructions are further executable by the processor to cause the apparatus to:
receive a sidelink synchronization signal block transmission from the second UE.

12. The apparatus of claim 11, wherein a periodicity of transmission of the first sidelink synchronization reference signal is shorter than a periodicity of transmission of the sidelink synchronization signal block transmission.

13. An apparatus for wireless communications by a first user equipment (UE), comprising:
a processor,
memory coupled with the processor; and
instructions stored in the memory and executable by the processor to cause the apparatus to:
perform a beam sweep procedure with a second UE to identify a transmission beam to use for communication with the second UE over a sidelink channel;
transmit, via the sidelink channel, a first sidelink synchronization reference signal to the second UE using the transmission beam identified in the beam sweep procedure; and
communicate a first transmission via the sidelink channel using the transmission beam based at least in part on time synchronization, frequency synchronization, or both, corresponding to the first sidelink synchronization reference signal.

14. The apparatus of claim 13, wherein the instructions are further executable by the processor to cause the apparatus to:
transmit control signaling indicating a periodicity of transmission of the first sidelink synchronization reference signal, wherein the first sidelink synchronization reference signal is transmitted in accordance with the periodicity.

15. The apparatus of claim 13, wherein the instructions are further executable by the processor to cause the apparatus to:
transmit control signaling scheduling transmission of the first sidelink synchronization reference signal, wherein the first sidelink synchronization reference signal is transmitted in accordance with the control signaling.

16. The apparatus of claim 13, wherein the instructions are further executable by the processor to cause the apparatus to:
receive control signaling requesting transmission of the first sidelink synchronization reference signal, wherein the first sidelink synchronization reference signal is transmitted in accordance with the control signaling.

17. The apparatus of claim 13, wherein the instructions are further executable by the processor to cause the apparatus to:
transmit control signaling indicating a semi-persistent transmission schedule for transmission of the first sidelink synchronization reference signal, wherein the first sidelink synchronization reference signal is transmitted in accordance with the control signaling.

18. The apparatus of claim 13, wherein the instructions to transmit the first sidelink synchronization reference signal are executable by the processor to cause the apparatus to:
transmit the first sidelink synchronization reference signal that indicates an identifier of the first UE.

19. The apparatus of claim 13, wherein the instructions are further executable by the processor to cause the apparatus to:
transmit a sidelink synchronization signal block transmission.

20. The apparatus of claim 19, wherein a periodicity of transmission of the first sidelink synchronization reference signal is shorter than a periodicity of transmission of the sidelink synchronization signal block transmission.

21. A method for wireless communications by a first user equipment (UE), comprising:
performing a beam sweep procedure with a second UE to identify a receive beam to use for communication with the second UE over a sidelink channel;
receiving, via the sidelink channel, a first sidelink synchronization reference signal from the second UE using the receive beam identified in the beam sweep procedure; and communicating a first transmission via the sidelink channel based at least in part on time synchronization, frequency synchronization, or both, determined using the first sidelink synchronization reference signal.

22. The method of claim 21, further comprising:
receiving control signaling indicating a periodicity of transmission of the first sidelink synchronization reference signal by the second UE; and
monitoring the sidelink channel for a transmission of the first sidelink synchronization reference signal using the receive beam based at least in part on the periodicity.

23. The method of claim 21, further comprising:
receiving control signaling scheduling transmission of the first sidelink synchronization reference signal, wherein the first sidelink synchronization reference signal is received in accordance with the control signaling.

24. The method of claim 21, further comprising:
transmitting control signaling requesting transmission of the first sidelink synchronization reference signal, wherein the first sidelink synchronization reference signal is received in accordance with the control signaling.

25. The method of claim 21, further comprising:
receiving control signaling indicating a semi-persistent transmission schedule for transmission of the first sidelink synchronization reference signal by the second UE; and
monitoring the sidelink channel for a transmission of the first sidelink synchronization reference signal using the receive beam based at least in part on the semi-persistent transmission schedule.

26. The method of claim 21, further comprising:
receiving, via the sidelink channel, a second synchronization reference signal from a third UE using the receive beam; and
communicating a second transmission via the sidelink channel based at least in part on time synchronization, frequency synchronization, or both, determined using the second synchronization reference signal.

27. A method for wireless communications by a first user equipment (UE), comprising:
performing a beam sweep procedure with a second UE to identify a transmission beam to use for communication with the second UE over a sidelink channel;
transmitting, via the sidelink channel, a first sidelink synchronization reference signal to the second UE using the transmission beam identified in the beam sweep procedure; and
communicating a first transmission via the sidelink channel using the transmission beam based at least in part on time synchronization, frequency synchronization, or both, corresponding to the first sidelink synchronization reference signal.

28. The method of claim 27, further comprising:
transmitting control signaling indicating a periodicity of transmission of the first sidelink synchronization reference signal, wherein the first sidelink synchronization reference signal is transmitted in accordance with the periodicity.

29. The method of claim 27, further comprising:
transmitting control signaling scheduling transmission of the first sidelink synchronization reference signal, wherein the first sidelink synchronization reference signal is transmitted in accordance with the control signaling.

30. The method of claim 27, further comprising:
receiving control signaling requesting transmission of the first sidelink synchronization reference signal, wherein the first sidelink synchronization reference signal is transmitted in accordance with the control signaling.

* * * * *